US007822787B2

United States Patent
Saika

(10) Patent No.: US 7,822,787 B2
(45) Date of Patent: Oct. 26, 2010

(54) METHOD OF RECONFIGURING NAS UNDER GNS

(75) Inventor: Nobuyuki Saika, Yokosuka (JP)

(73) Assignee: Hitachi, Ltd., Tokyo (JP)

(*) Notice: Subject to any disclaimer, the term of this patent is extended or adjusted under 35 U.S.C. 154(b) by 373 days.

(21) Appl. No.: 11/970,772

(22) Filed: Jan. 8, 2008

(65) Prior Publication Data

US 2008/0222158 A1 Sep. 11, 2008

(30) Foreign Application Priority Data

Mar. 9, 2007 (JP) .............................. 2007-059751

(51) Int. Cl.
  *G06F 17/30* (2006.01)
(52) U.S. Cl. ............. 707/809; 707/999.2; 707/999.201; 707/E17.01; 711/162
(58) Field of Classification Search ................. 707/609, 707/640, 687, 705, 809, 821, 999.2, 999.201; 707/E17.01; 709/203, 217, 225, 233; 711/162
See application file for complete search history.

(56) References Cited

U.S. PATENT DOCUMENTS

2002/0120763 A1* 8/2002 Miloushev et al. .......... 709/230
2006/0271598 A1* 11/2006 Wong et al. .................. 707/200
2008/0155214 A1* 6/2008 Shitomi ....................... 711/162

FOREIGN PATENT DOCUMENTS

JP  2006-172217 A  6/2006

* cited by examiner

*Primary Examiner*—Fred I Ehichioya
(74) *Attorney, Agent, or Firm*—Sughrue Mion, PLLC

(57) ABSTRACT

Provided is a file management method for a computer system having: one first server; a plurality of second servers; and a plurality of storage subsystems, the file management method including: providing, by the second server, as at least one file, data stored in the storage subsystem; executing, by the second server, at least one first program; obtaining, by the first server, from the second server, a utilization state of the first program executed by the second server; judging, by the first server, from the obtained first program utilization state, whether or not migration of the file group is necessary; and instructing, by the first server, the second servers to migrate the file group in a case where it is judged that the file group needs to migrate. Accordingly, programs stored in NAS constituting GNS can be used efficiently.

14 Claims, 19 Drawing Sheets

| GLOBAL PATH | NAS NAME | LOCAL PATH |
|---|---|---|
| /GNS-Root/Dir-01/Dire-02/FS3 | NAS-03 | /mnt/FS3 |
| /GNS-Root/Dir-01/Dire-02/FS4 | NAS-04 | /mnt/FS4 |
| /GNS-Root/Dir-01/FS2 | NAS-02 | /mnt/FS2 |
| /GNS-Root/FS1 | NAS-01 | /mnt/FS1 |

GNS DEFINITION TABLE

FIG. 5

| 921 | 922 | 923 | 924 |
|---|---|---|---|
| NAS NAME | FILE GROUP NAME | NFS ACCESS COUNT | CIFS ACCESS COUNT |
| NAS-01 | Fileshare-01 | 0 | 15000 |
| : | : | : | : |

92

FILE SHARING PROGRAM UTILIZATION STATE TABLE

FIG. 7

| 931 | 932 | 933 | 934 |
|---|---|---|---|
| NAS NAME | FILE GROUP NAME | SNAPSHOT CREATION COUNT | SNAPSHOT MOUNT COUNT |
| NAS-01 | Fileshare-01 | 300 | 150 |
| : | : | : | : |

93

SNAPSHOT SUB-PROGRAM UTILIZATION STATE TABLE

FIG. 8

| 941 | 942 | 943 | 944 |
|---|---|---|---|
| NAS NAME | FILE GROUP NAME | EXECUTED BACK-UP COUNT | EXECUTED RESTORATION COUNT |
| NAS-01 | Fileshare-01 | 100 | 25 |
| : | : | : | : |

94

BACK-UP SUB-PROGRAM UTILIZATION STATE TABLE

FIG. 9

| 951 | 952 | | 953 | 954 | 955 | 956 | 957 |
|---|---|---|---|---|---|---|---|
| NAS NAME | FILE SHARING PROGRAM | | SNAPSHOT SUB-PROGRAM | BACK-UP SUB-PROGRAM | FILE SYSTEM CAPACITY | NAS-CPU UTILIZATION RATIO | DISK SUBSYSTEM UTILIZATION RATIO |
| | CIFS | NFS | | | | | |
| NAS-01 | ○ | ○ | ○ | ○ | 200GB | 20% | 30% |
| NAS-02 | ○ | ○ | ○ | × | 180GB | 40% | 20% |
| : | : | : | : | : | : | : | : |
| : | : | : | : | : | : | : | : |

9521  9522       95

INSTALLED PROGRAM MANAGEMENT TABLE

FIG. 10

| 961 | 962 |
|---|---|
| CONDITION | MIGRATION DESTINATION NAS TYPE NAME |
| SNAPSHOT CREATION COUNT >X1 AND MOUNT COUNT > Y1 AND ACCESS COUNT >W1 | TYPE-I |
| SNAPSHOT CREATION COUNT <X1 OR MOUNT COUNT < Y2 AND ACCESS COUNT >W2 | TYPE-II |
| SNAPSHOT CREATION COUNT <X2 OR MOUNT COUNT < Y3 AND ACCESS COUNT >W3 | TYPE-III OR TYPE-IV |
| : | : |

96
MIGRATION DESTINATION NAS DETERMINING RULE

FIG. 11

| 971 | 972 | 973 |
|---|---|---|
| NAS TYPE NAME | INSTALLED PROGRAM | LOAD STATE |
| TYPE-I | CIFS, NFS, SNAPSHOT, BACKUP | NAS-CPU UTILIZATION RATIO < Z1% AND DISK SUBSYSTEM UTILIZATION RATIO < Z2% |
| TYPE-II | CIFS, NFS, SNAPSHOT, BACKUP | NAS-CPU UTILIZATION RATIO < Z3% AND DISK SUBSYSTEM UTILIZATION RATIO < Z4% |
| TYPE-III | CIFS, NFS, SNAPSHOT | NAS-CPU UTILIZATION RATIO <Z5% AND DISK SUBSYSTEM UTILIZATION RATIO < Z6% |
| TYPE-IV | CIFS, NFS, BACKUP | : |
| TYPE-V | CIFS, NFS | : |
| : | : | : |

97
NAS TYPE DEFINITION TABLE

FIG. 12

```
<NAS NAME>
NAS-02

<CAPACITY/UTILIZATION RATIO>
FILE SYSTEM CAPACITY   NAS-CPU UTILIZATION RATIO   DISK SUBSYSTEM UTILIZATION RATIO
200GB                  20%                         30%

<PROGRAM LIST>
FILE SHARING PROGRAM
SNAPSHOT SUB-PROGRAM
BACK-UP SUB-PROGRAM

<FILE SHARING PROGRAM>
FILE GROUP NAME   NFS ACCESS COUNT   CIFS ACCESS COUNT
Fileshare-01      15000              0

<SNAPSHOT SUB-PROGRAM>
FILE GROUP NAME   SNAPSHOT CREATION COUNT   SNAPSHOT MOUNT COUNT
Fileshare-01      300                       150

<BACK-UP SUB-PROGRAM>
FILE GROUP NAME   EXECUTED BACK-UP COUNT   EXECUTED RESTORATION COUNT
Fileshare-01      10                       1
```

13311

UTILIZATION STATE NOTIFICATION FILE

FIG. 13

```
<FILE GROUP MIGRATION COMPLETION NOTIFICATION SCREEN>
THE FOLLOWING NAS FILE GROUP HAS BEEN MIGRATED

MIGRATION SOURCE NAS : NAS-05
MIGRATED FILE GROUP : Fileshare-01
     MIGRATION DESTINATION : NAS-04
       CAUSE OF MIGRATION : EXCEEDED UPPER LIMIT SNAPSHOT COUNT
```

*FIG. 22*

```
< FILE GROUP MIGRATION RECOMMENDATION SCREEN >
MIGRATION OF THE FOLLOWING NAS FILE GROUP IS RECOMMENDED

MIGRATION SOURCE NAS : NAS-05
FILE GROUP TO MIGRATE : Fileshare-01
     BASIS OF RECOMMENDATION: EXCEEDED UPPER LIMIT SNAPSHOT COUNT
     MIGRATION DESTINATION NAS : [ NAS-04 ]

[ MIGRATE ] [ CANCEL ]
```

*FIG. 23*

METHOD OF RECONFIGURING NAS UNDER GNS

CLAIM OF PRIORITY

The present application claims priority from Japanese patent application P2007-59751 filed on Mar. 9, 2007, the content of which is hereby incorporated by reference into this application.

BACKGROUND

This invention relates to a computer system having a plurality of servers and a plurality of storage subsystems, and more specifically, to a technique of managing files.

JP 2006-172217 A discloses a technique called "global name space" (GNS). In GNS, a plurality of network attached storage (NAS) elements are provided as a single NAS element to a client computer.

SUMMARY

In a large-scale GNS constituted of many NAS elements, it is difficult to collect and manage information about which NAS element has what characteristics. The GNS accordingly cannot make efficient use of all programs in the NAS elements constituting the GNS. For instance, the difficulty can prevent the GNS from effectively using a snapshot program, a file sharing program, or a back-up program in the NAS elements.

This invention has been made in view of the above problem, and it is therefore an object of this invention to provide a computer system capable of efficiently using programs in the NAS elements that constitutes GNS.

According to an exemplary embodiment of this invention, there is provided A file management method for a computer system having: one first server accessed by a client computer; a plurality of second servers coupled to the first server via a network; and a plurality of storage subsystems coupled to the second servers, the file management method comprising: providing, by the second server, as at least one file, data stored in the storage subsystem; executing, by the second server, at least one first program which performs processing related to a file group, the file group including the at least one file; integrating, by the first server, directory structures that are unique to the respective second servers to provide a directory structure that is unique throughout the computer system to the client computer; obtaining, by the first server, from the second server, a utilization state of the first program executed by the second server; judging, by the first server, from the obtained first program utilization state, whether or not migration of the file group is necessary; and instructing, by the first server, the second server to migrate the file group in a case where it is judged that the file group needs to migrate.

According to a representative aspect of this invention, programs in the NAS elements constituting GNS are used efficiently.

BRIEF DESCRIPTION OF THE DRAWINGS

The present invention can be appreciated by the description which follows in conjunction with the following figures, wherein:

FIG. 5 is a configuration diagram of the GNS definition table according to the embodiment of this invention;

FIG. 7 is a configuration diagram of the file sharing program utilization state table according to the embodiment of this invention;

FIG. 8 is a configuration diagram of the snapshot subprogram utilization state table according to the embodiment of this invention;

FIG. 9 is a configuration diagram of the back-up subprogram utilization state table according to the embodiment of this invention;

FIG. 10 is a configuration diagram of the installed program management table according to the embodiment of this invention;

FIG. 11 is a configuration diagram of the migration destination NAS type determining rule according to the embodiment of this invention;

FIG. 12 is a configuration diagram of the NAS type definition table according to the embodiment of this invention;

FIG. 13 is a configuration diagram of the utilization state notification file according to the embodiment of this invention;

FIG. 22 is an explanatory diagram of the file group migration completion notification screen displayed by the management computer according to the embodiment of this invention; and FIG. 23 is an explanatory diagram of the file group migration recommendation screen displayed by the management computer according to the embodiment of this invention.

DETAILED DESCRIPTION OF THE PREFERRED EMBODIMENTS

An embodiment of this invention will be described below with reference to the accompanying drawings.

Figure 1:
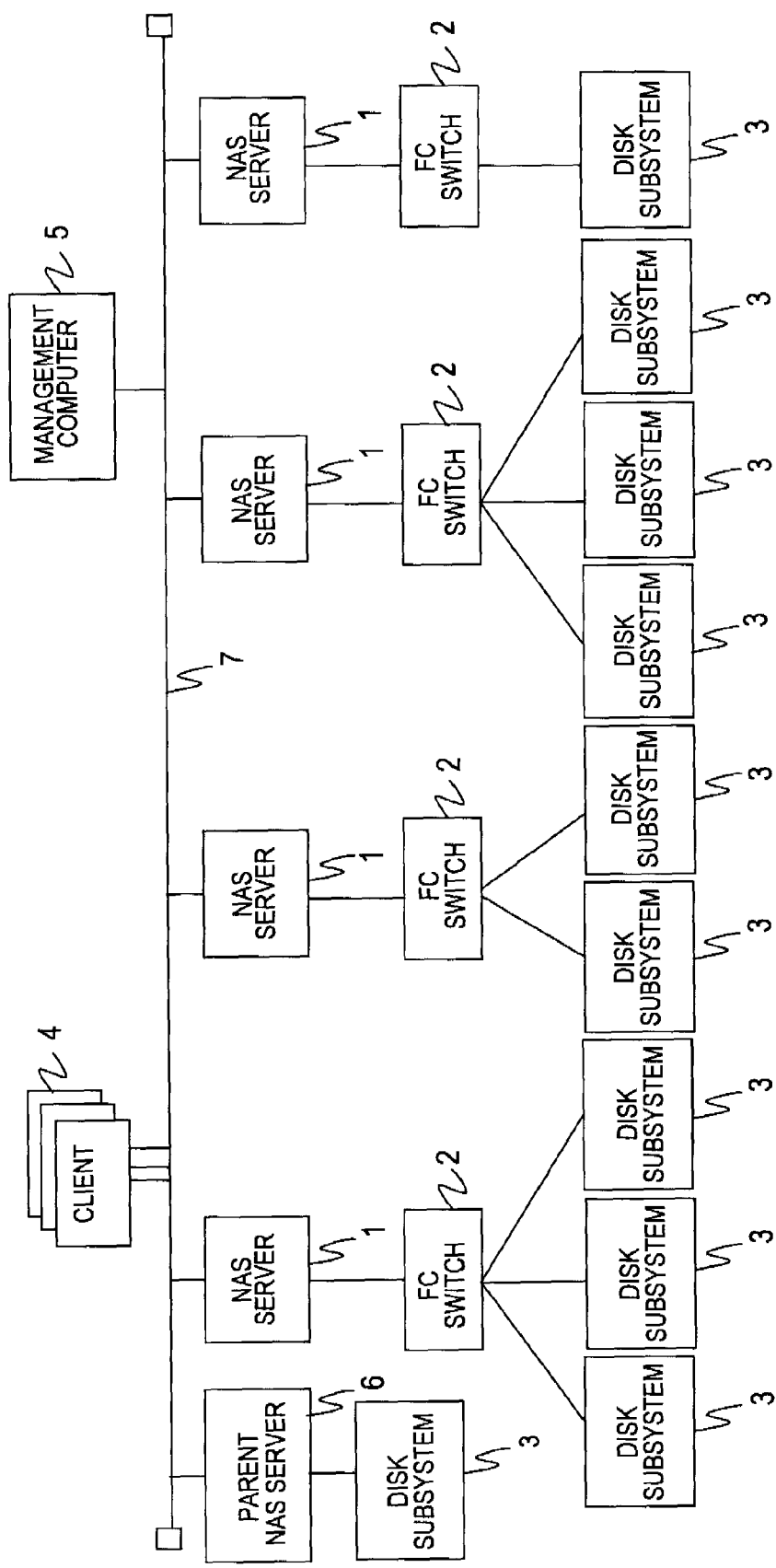
FIG. 1 is a block diagram showing the configuration of a computer system according to the embodiment of this invention.

FIG. 1 is a block diagram showing the configuration of a computer system according to the embodiment of this invention.

The computer system has parent NAS, NAS, a client computer 4, a management computer 5, and a local area network (LAN) 7.

The parent NAS has a parent NAS server 6 and a disk subsystem 3. The NAS has a NAS server 1, a fibre channel (FC) switch 2, and its own disk subsystem 3.

The LAN 7 interconnects the parent NAS server 6, the NAS server 1, the client computer 4, and the management computer 5. The FC switch 2 connects the NAS server 1 and the disk subsystem 3 to each other.

The NAS server 1 is connected to one or more disk subsystems 3 via the FC switch 2. The parent NAS server 6, which, in FIG. 1, is connected to one disk subsystem 3, may be connected to a plurality of disk subsystems 3.

Each disk subsystem 3 stores data requested by the client computer 4 to be written. Details of the disk subsystem 3 will be described with reference to FIG. 4.

The computer system may have a semiconductor memory device in place of the disk subsystem 3. The semiconductor memory device uses a flash memory or the like as a memory device.

The NAS server 1 provides a file sharing service to the client computer 4. For instance, the NAS server 1 receives a file input/output request and converts the received file input/output request into a block input/output request. The NAS server 1 then sends the block input/output request obtained by the conversion to the disk subsystem 3. Details of the NAS server 1 will be described with reference to FIG. 2.

The parent server 6 has a global name space (GNS) function in addition to the function of the NAS server 1. It should be noted that details of the parent NAS server 6 will be described with reference to FIG. 3. Details of GNS will be described with reference to FIG. 6.

The client computer 4 is a computer having a CPU, a memory, and an interface. Further, the client computer 4 receives a file sharing service from the parent NAS server 6 and the NAS server 1. The client computer 4 sends a file input/output request to the parent NAS server 6 to receive the file sharing service.

The management computer 5 is a computer having a CPU, a memory, and an interface. The management computer 5 handles the overall management of this computer system.

Figure 2:
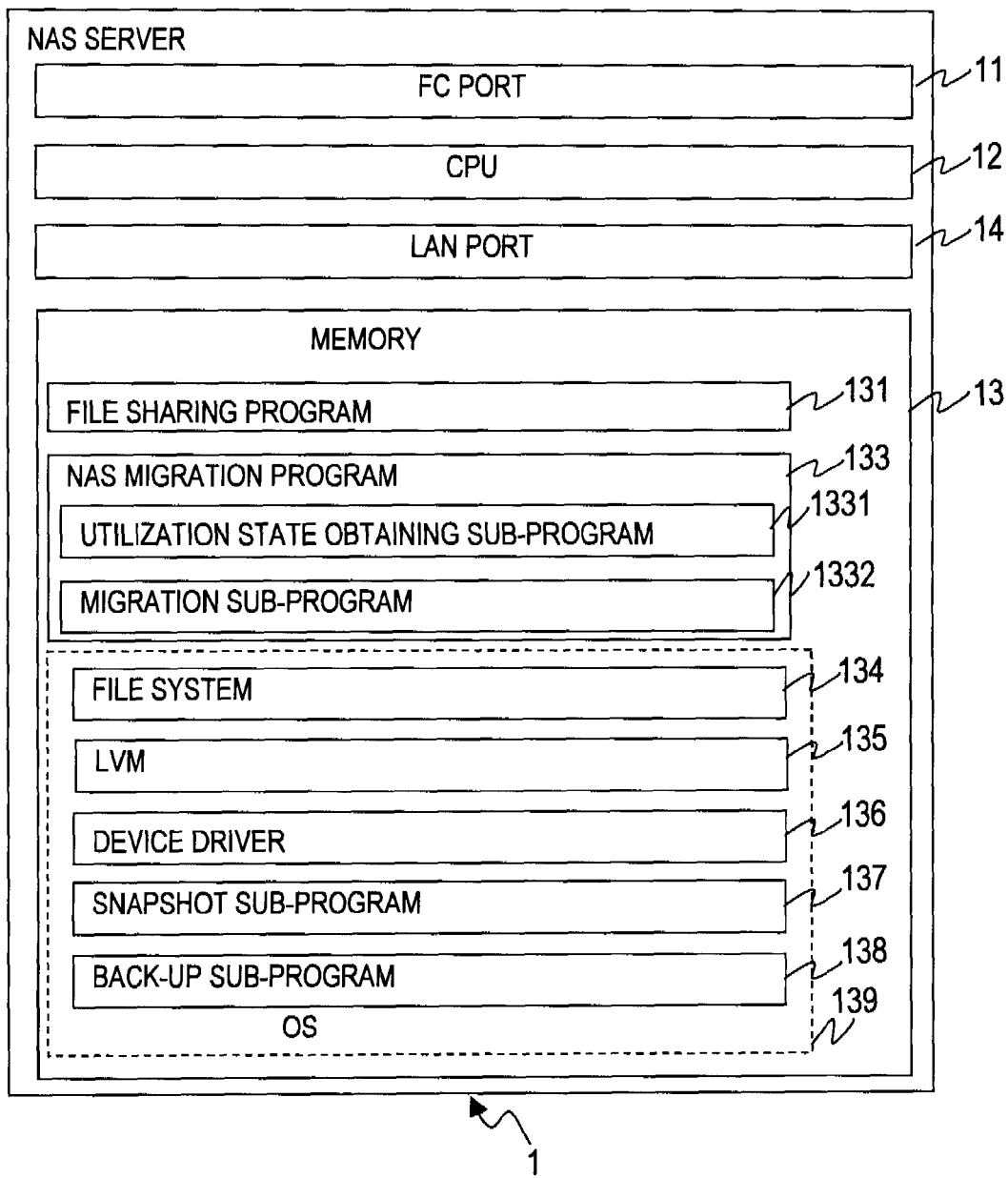
FIG. 2 is a block diagram showing the configuration of the NAS server in the computer system according to the embodiment of this invention.

FIG. 2 is a block diagram showing the configuration of the NAS server 1 in the computer system according to the embodiment of this invention.

The NAS server 1 has an FC port 11, a CPU 12, a memory 13, and a LAN port 14.

The FC port 11 is an interface connected to the disk subsystem 3 via the FC switch 2. The LAN port 14 is an interface connected to the client computer 4, the management computer 5, the parent NAS server 6, and the other NAS server 1 via the LAN 7.

The CPU 12 performs various types of processing by executing a program stored in the memory 13.

The memory 13 stores a program executed by the CPU 12, information necessary for the CPU 12, and the like. Specifically, the memory 13 stores a file sharing program 131, a NAS migration program 133, and an operating system (OS) 139.

The file sharing program 131 provides a file sharing service to the client computer 4. A file sharing protocol such as network file system (NFS) protocol, or common internet file system (CIFS) protocol is used between the NAS server 1 and the client computer 4. The file sharing program 131 may be compatible with the NFS protocol and the CIFS protocol both, or may be compatible with only one of the NFS protocol and the CIFS protocol.

The NAS migration program 133 performs processing related to migration of a file group from one NAS server 1 to another. The NAS migration program 133 contains a utilization state obtaining sub-program 1331 and a migration sub-program 1332.

The utilization state obtaining sub-program 1331 obtains the utilization state of the file sharing program 131, a snapshot sub-program 137, and a back-up subprogram 138. The utilization state obtaining sub-program 1331 creates a utilization state notification file 13311, which contains the obtained utilization state. The created utilization state notification file 13311 is sent from the utilization state obtaining sub-program 1331 to the parent NAS server 6. The utilization state obtaining processing executed by the utilization state obtaining sub-program 1331 will be described in detail with reference to FIG. 18. Details of the utilization state notification file 13311 will be described with reference to FIG. 13.

The migration sub-program 1332 causes a file to migrate from one NAS server 1 to another. The migration processing executed by the migration sub-program 1332 will be described in detail with reference to FIG. 21.

The OS 139 controls the overall processing of the NAS server 1. The OS 139 contains a file system 134, a logical volume manager (LVM) 135, a device driver 136, the snapshot sub-program 137, and the back-up sub-program 138.

The file system 134 provides data stored in the disk subsystem 3 to the client computer 4 and others as a file. For instance, the file system 134 converts a file input/output request into a block input/output request. The memory 13 may store a plurality of file systems 134 so that the NAS server 1 can provide different file sharing services to the client computer 4.

The LVM 135 provides a plurality of LUs 35, which are provided by the disk subsystem 3, to the file system 134 as one LU.

The device driver 136 sends a block input/output request to the disk subsystem 3, thereby inputting and outputting data to and from the disk subsystem 3.

The snapshot sub-program 137 takes a snapshot, which is a copy of an operational volume at a specific time, while keeping its NAS server 1 accessible to the client computer 4.

An operational volume is one of the logical volumes (LUs) 35 provided by the disk subsystem 3 that stores data requested by the client computer 4 to be written. A snapshot in this embodiment can be of any type as long as it is a copy made while the NAS server 1 in question is kept accessible to the client computer 4. For example, the snapshot sub-program 137 can take a full-copy snapshot or a differential snapshot.

The snapshot sub-program 137 mounts a snapshot when receiving a request to mount the snapshot.

The snapshot sub-program 137 may not be contained in the OS 139.

The back-up sub-program 138 takes a backup of data stored in the disk subsystem 3 while access to its NAS server 1 from the client computer 4 is suspended. Upon receiving a restoration request, the back-up sub-program 138 uses the backup data to restore the data stored in the disk subsystem 3. Back-up and restoration in this embodiment can be executed by any methods.

The back-up sub-program 138 may not be contained in the OS 139.

The memory 13 in the NAS server 1 may further store a parent NAS migration program 632. In this case, when a failure occurs in the parent NAS server 6, the NAS server 1 can function as the parent NAS server 6. Details of the parent NAS migration program 632 will be described with reference to FIG. 3.

Figure 3:
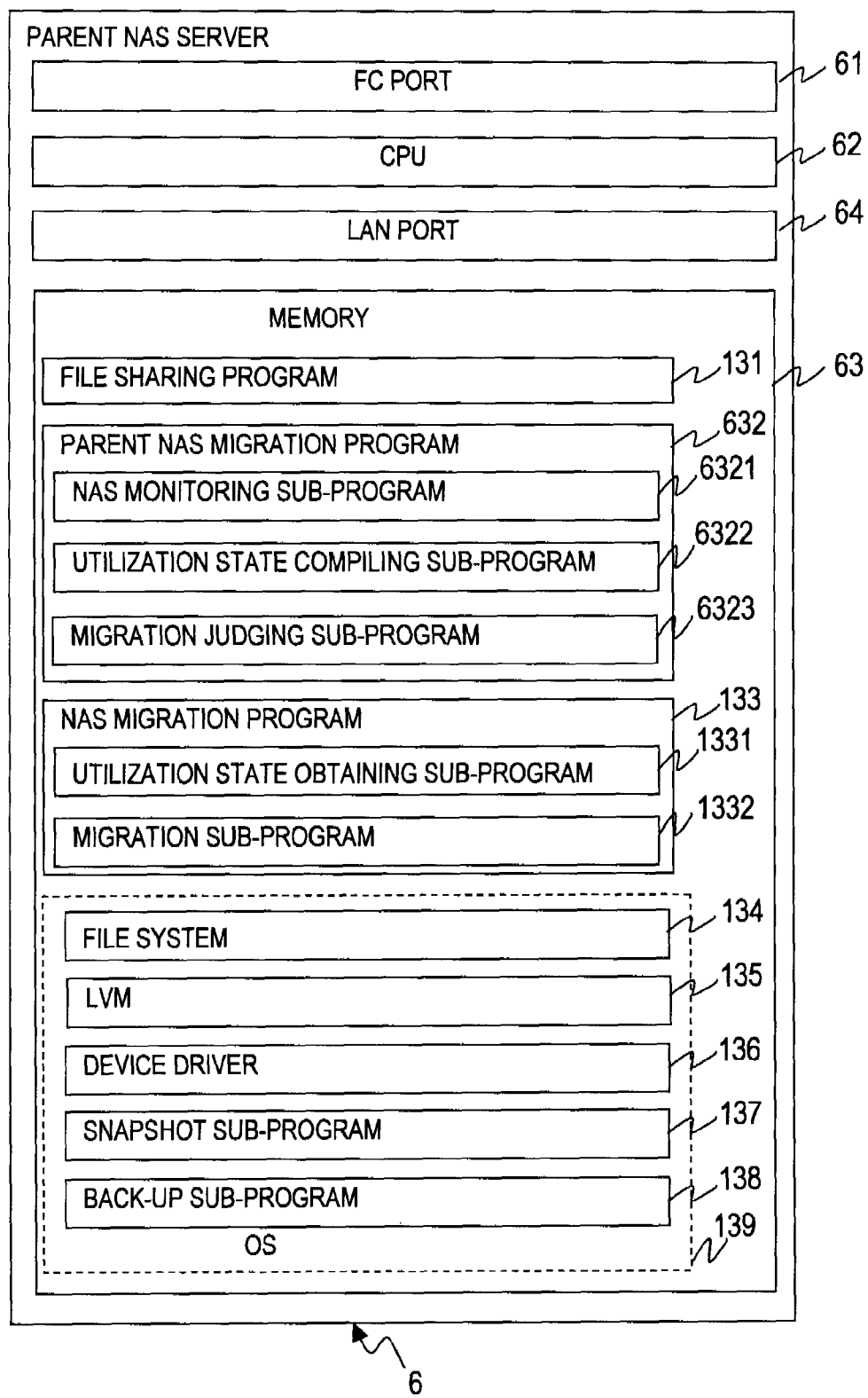
FIG. 3 is a block diagram showing the configuration of the parent NAS server in the computer system according to the embodiment of this invention.

FIG. 3 is a block diagram showing the configuration of the parent NAS server 6 in the computer system according to the embodiment of this invention.

The parent NAS server 6 has an FC port 61, a CPU 62, a memory 63, and a LAN port 64.

The FC port 61 is an interface connected to the disk subsystem 3 via the FC switch 2. The LAN port 64 is an interface connected to the NAS server 1, the client computer 4, and the management computer 5 via the LAN 7.

The CPU 62 performs various types of processing by executing a program stored in the memory 63.

The memory 63 stores a program executed by the CPU 62, information needed by the CPU 62, and the like. Specifically, the memory 63 stores the file sharing program 131, the parent NAS migration program 632, the NAS migration program 133, and the operating system (OS) 139. The file sharing program 131, the NAS migration program 133, and the OS 139 in the memory 63 are the same as those in the memory 13 of the NAS server 1 shown in FIG. 2, and their descriptions will be omitted here.

The parent NAS migration program 632 performs processing related to migration of a file group from one NAS server 1 to another. The parent NAS migration program 632 contains a NAS monitoring sub-program 6321, a utilization state totalizing sub-program 6322, and a migration judging sub-program 6323.

The NAS monitoring sub-program 6321 causes the NAS server 1 that is newly added to the GNS managed by its parent NAS server 6 to download the NAS migration program 133. The NAS monitoring processing executed by the NAS monitoring sub-program 6321 will be described in detail with reference to FIG. 17.

The utilization state totalizing sub-program 6322 receives the utilization state notification file 13311 from the NAS server 1. According to the received utilization state notification file 13311, the utilization state totalizing sub-program 6322 updates a file sharing program utilization state table 92, a snapshot sub-program utilization state table 93, a back-up sub-program utilization state table 94, and an installed program management table 95. The utilization state totalizing processing executed by the utilization state totalizing sub-program 6322 will be described in detail with reference to FIG. 19.

The migration judging sub-program 6323 judges whether or not a file group needs to migrate from one NAS server 1 to another. When file group migration is necessary, the migration judging sub-program 6323 sends a file group migration request to the NAS server 1 to which the file group should migrate. The migration judging processing executed by the migration judging sub-program 6323 will be described in detail with reference to FIG. 20.

Figure 4:
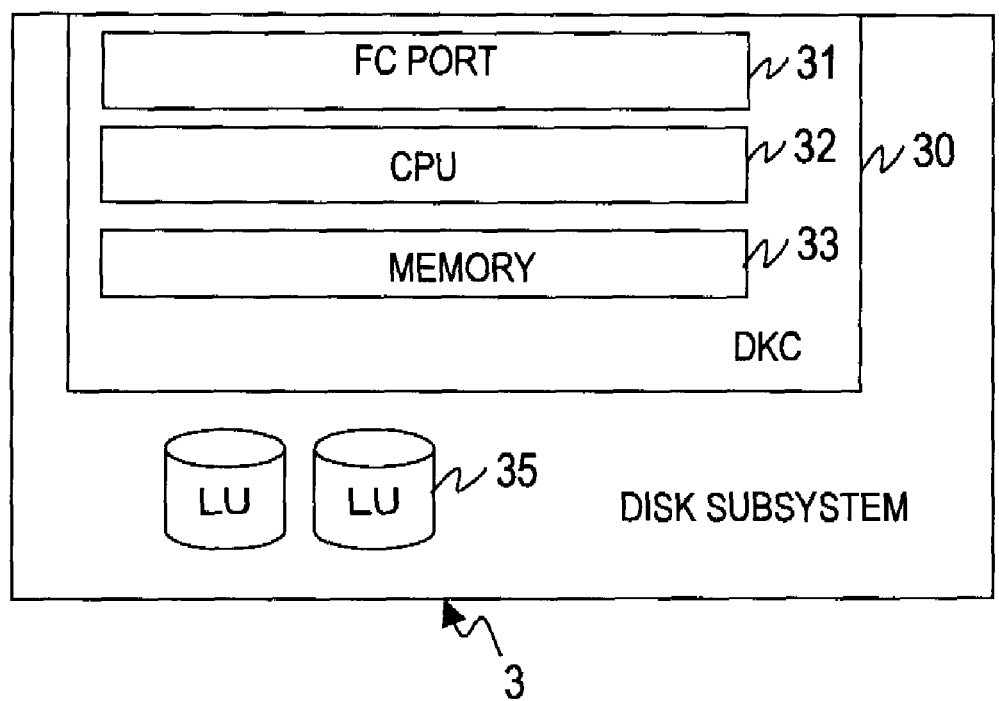
FIG. 4 is a block diagram showing the configuration of the disk subsystem in the computer system according to the embodiment of this invention.

FIG. 4 is a block diagram showing the configuration of the disk subsystem 3 in the computer system according to the embodiment of this invention.

The disk subsystem 3 has a disk controller (DKC) 30 and a physical disk.

The physical disk stores data requested by the client computer 4 to be written. The disk controller 30 provides the storage area of the physical disk to the NAS server 1 or the parent NAS server 9 as one or more logical volumes (LUs) 35.

The disk controller 30 has an FC port 31, a CPU 32, and a memory 33. The FC port 31 is an interface connected to the NAS server 1 or the parent NAS server 6 via the FC.

The CPU 32 performs various types of processing by executing a program stored in the memory 33.

The memory 33 stores a program executed by the CPU 32, information necessary for the CPU 32, and the like. For example, the memory 33 stores an IOP, which inputs and outputs data to and from the physical disk according to a block input/output request received from the NAS server 1 or the parent NAS server 6.

Part of the memory 33 is used as a cache memory. The cache memory temporarily stores data to be written in the physical disk and data read out of the physical disk.

The LU 35 of the disk subsystem 3 that is connected to the parent NAS server 6 stores a GNS definition table 91, the file sharing program utilization state table 92, the snapshot sub-program utilization state table 93, the back-up sub-program utilization state table 94, the installed program management table 95, a migration destination NAS type determining rule 96, and a NAS type definition table 97.

At least one of the GNS definition table 91, the file sharing program utilization state table 92, the snapshot sub-program utilization state table 93, the back-up sub-program utilization state table 94, the installed program management table 95, the migration destination NAS type determining rule 96, and the NAS type definition table 97 may be stored in the memory 63 of the parent NAS server 6 instead of the LU 35 in the disk subsystem 3 that is connected to the parent NAS server 6.

The GNS definition table 91 shows the association between a global path, which is used to identify a file system 134 uniquely throughout the computer system, and a local path, which is used to identify the file system 134 uniquely throughout the NAS server 1. Details of the GNS definition table 91 will be described with reference to FIG. 5.

The file sharing program utilization state table 92 shows the utilization state of the file sharing program 131 in the NAS server 1. Details of the file sharing program utilization state table 92 will be described with reference to FIG. 7.

The snapshot sub-program utilization state table 93 shows the utilization state of the snapshot sub-program 137 in the NAS server 1. Details of the snapshot sub-program utilization state table 93 will be described with reference to FIG. 8.

The back-up sub-program utilization state table 94 shows the utilization state of the back-up sub-program 138 in the NAS server 1. Details of the back-up sub-program utilization state table 94 will be described with reference to FIG. 9.

The installed program management table 95 shows the type of a program (or sub-program) that has been installed in the NAS server 1. Details of the installed program management table 95 will be described with reference to FIG. 10.

The migration destination NAS type determining rule 96 indicates a rule used to determine to which NAS server 1 a file group should migrate. Details of the migration destination NAS type determining rule 96 will be described with reference to FIG. 11.

The NAS type definition table 97 shows the association between a NAS type and the spec. of the NAS server 1 that is classified into this NAS type. Each NAS server 1 is classified into one of NAS types according to its spec. Details of the NAS type definition table 97 will be described with reference to FIG. 12.

FIG. 5 is a configuration diagram of the GNS definition table 91 according to the embodiment of this invention.

The GNS definition table 91 contains a global path 911, a NAS name 912, and a local path 913.

The global path 911 indicates a path that is used to identify each file system 134 in the NAS server 1 uniquely throughout the computer system.

The NAS name 912 indicates an identifier unique to the NAS server 1 that has the file system 134 identified by the global path 911 of the record entry in question.

The local path 913 indicates a path that is used for unique identification of the file system 134 identified by the global path 911 of the record in question throughout the NAS server 1 identified by the NAS name 912 of the record.

Figure 6:
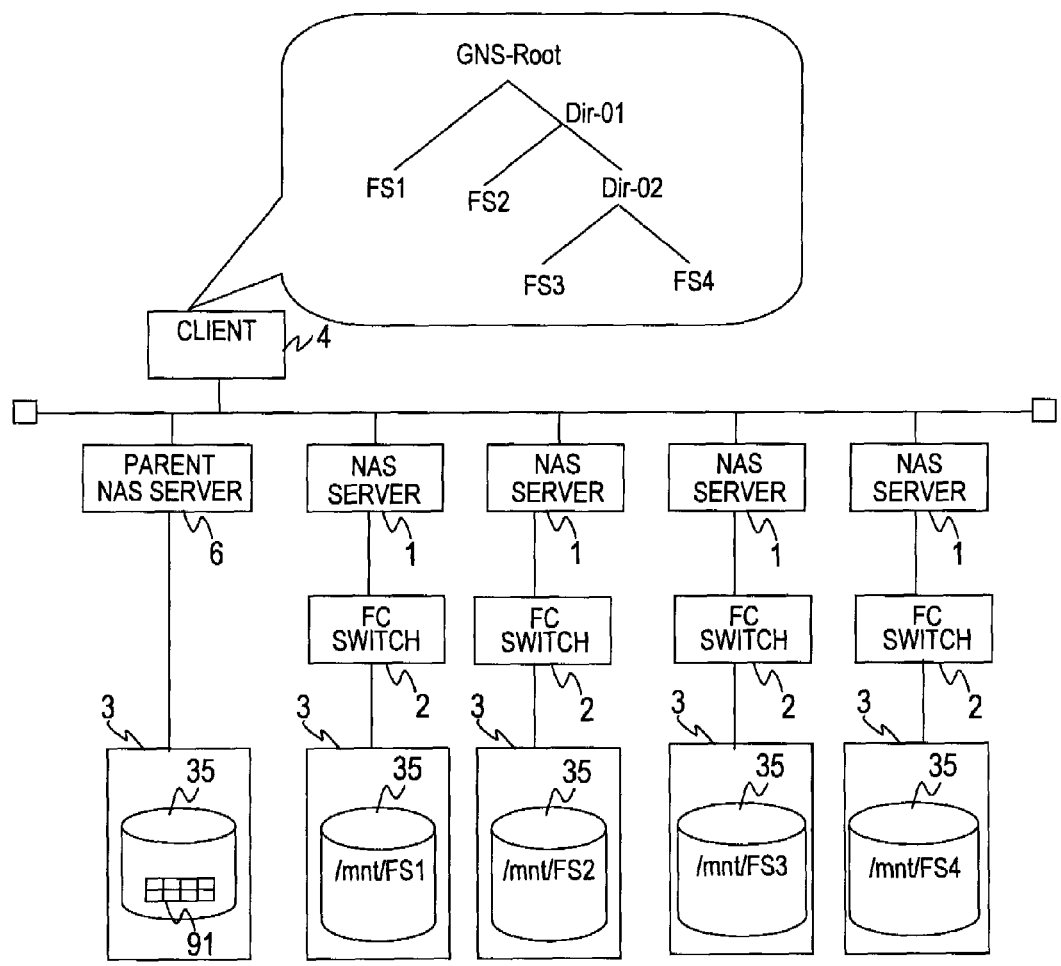
FIG. 6 is an explanatory diagram of GNS in the computer system according to the embodiment of this invention.

FIG. 6 is an explanatory diagram of GNS in the computer system according to the embodiment of this invention.

The parent NAS server 6 provides a plurality of file systems 134 in a plurality of NAS servers 1 as one tree view to the client computer 4.

As an example, a case will be described in which the GNS definition table 91 of FIG. 5 is stored in the LU 35 of the disk subsystem 3 that is connected to the parent NAS server 6.

In this example, the NAS server 1 that is identified by "NAS-01" has the file system 134 that is identified by "FS1". The NAS server 1 that is identified by "NAS-02" has the file system 134 that is identified by "FS2". The NAS server 1 that is identified by "NAS-03" has the file system 134 that is identified by "FS3". The NAS server 1 that is identified by "NAS-04" has the file system 134 that is identified by "FS4". Each file system 134 is mounted under a local directory "/mnt" of its NAS server 1.

The client computer 4 accesses the parent NAS server 6 to refer to a tree view as the one shown in the balloon of FIG. 6.

In the case where the client computer 4 is to access data "/GNS-Root/Dir-01/FS2/a.txt", the client computer 4 sends an access request that contains "/GNS-Root/Dir-01/FS2/a.txt" as an access destination to the parent NAS server 6. An access request is a write request, a read request, or the like.

Receiving the access request, the parent NAS server 6 chooses from the GNS definition table 91 a record entry whose global path 911 of the GNS definition table 91 matches a global path "/GNS-Root/Dir-01/FS2" contained in the received access request. The parent NAS server 6 extracts the NAS name 912 and the local path name 913 from the chosen record.

The parent NAS server 6 thus recognizes the data "/GNS-Root/Dir-01/FS2/a.txt" as a file provided by the file system 134 that is identified by the extracted local path 913, "/mnt/FS2". The file system 134 that is identified by the extracted local path 913, "/mnt/FS2", is located in the NAS server 1 that is identified by the extracted NAS name 912, "NAS-02".

The parent NAS server 6 accordingly converts the destination "/GNS-Root/Dir-01/FS2/a.txt" contained in the received access request into "/mnt/FS2/a.txt". The parent NAS server 6 sends the converted access request to the NAS server 1 that is identified by the extracted NAS name 912, "NAS-02".

Alternatively, the parent NAS server 6 may perform the following processing.

Upon receiving an access request, the parent NAS server 6 chooses from the GNS definition table 91 a record entry whose global path 911 of the GNS definition table 91 matches a global path contained in the received access request. From the chosen record, the parent NAS server 6 extracts the NAS name 912 and the local path 913.

The parent NAS server 6 then sends the extracted NAS name 912 and local path 913 to the client computer 4. The client computer 4 sends an access request that contains the received NAS name 912 and local path 913 as an access destination to the NAS server 1 that is identified by the received NAS name 912.

This way, the client computer 4 can access a file without the intervention of the parent NAS server 6, and the load on the parent NAS server 6 is accordingly lessened.

FIG. 7 is a configuration diagram of the file sharing program utilization state table 92 according to the embodiment of this invention.

The file sharing program utilization state table 92 contains a NAS name 921, a file group name 922, an NFS access count 923, and a CIFS access count 924.

The NAS name 921 indicates an identifier unique to each NAS server 1 having the file sharing program 131.

The file group name 922 indicates an identifier unique to a file group managed by the NAS server 1 that is identified by the NAS name 921 of a record entry in question. A file group is the unit of file migration and contains one or more files.

For instance, one file group contains all files that are associated with one file sharing service. One file sharing service is provided by one file system 134 of the NAS server 1.

The NFS access count 923 indicates how many times a file group that is identified by the file group name 922 of a record entry in question has been accessed by the NFS protocol within a given period of time. The CIFS access count 924 indicates how many times a file group that is identified by the file group name 922 of a record entry in question has been accessed by the CIFS protocol within a given period of time.

FIG. 8 is a configuration diagram of the snapshot sub-program utilization state table 93 according to the embodiment of this invention.

The snapshot sub-program utilization state table 93 contains a NAS name 931, a file group name 932, a snapshot creation count 933, and a snapshot mount count 934.

The NAS name 931 indicates an identifier unique to each NAS server 1 having the snapshot sub-program 137. The file group name 932 indicates an identifier unique to a file group managed by the NAS server 1 that is identified by the NAS name 931 of a record entry in question.

The snapshot creation count 933 indicates how many times a snapshot has been taken of a file group that is identified by the file group name 932 of a record entry in question within a given period of time. The snapshot mount count 934 indicates how many times a snapshot of a file group that is identified by the file group name 932 of a record entry in question has been mounted within a given period of time.

FIG. 9 is a configuration diagram of the back-up sub-program utilization state table 94 according to the embodiment of this invention.

The back-up sub-program utilization state table 94 contains a NAS name 941, a file group name 942, an executed back-up count 943, and an executed restoration count 944.

The NAS name 941 indicates an identifier unique to each NAS server 1 having the back-up sub-program 138. The file group name 942 indicates an identifier unique to a file group managed by the NAS server 1 that is identified by the NAS name 941 of a record entry in question.

The executed back-up count 943 indicates how many times data in a file group that is identified by the file group name 942 of a record entry in question has been backed up within a given period of time. The executed restoration count 944 indicates how many times data in a file group that is identified by the file group name 942 of a record entry in question has been restored within a given period of time.

FIG. 10 is a configuration diagram of the installed program management table 95 according to the embodiment of this invention.

The installed program management table 95 contains a NAS name 951, a file sharing program indicator 952, a snapshot sub-program indicator 953, a back-up sub-program indicator 954, a file system capacity 955, a NAS-CPU utilization ratio 956, and a disk subsystem utilization ratio 957.

The NAS name 951 indicates an identifier unique to each NAS server 1 constituting the GNS.

The file sharing program indicator 952 indicates whether or not the NAS server 1 that is identified by the NAS name 951 of a record entry in question has the file sharing program 131. For example, when the NAS server 1 in question has the file sharing program 131, a circle (a symbol meaning true (T) in Japanese) is stored as the file sharing program indicator 952 whereas a cross (a symbol meaning false (F) in Japanese) is stored as the file sharing program indicator 952 when the NAS server 1 in question does not have the file sharing program 131.

The file sharing program indicator 952 may contain a CIFS file sharing program indicator 9521 and an NFS file sharing program indicator 9522. The CIFS file sharing program indicator 9521 indicates whether or not the NAS server 1 that is identified by the NAS name 951 of a record entry in question has the file sharing program 131 that is compatible with the CIFS protocol. The NFS file sharing program indicator 9522 indicates whether or not the NAS server 1 that is identified by the NAS name 951 of a record entry in question has the file sharing program 131 that is compatible with the NFS protocol.

The snapshot sub-program indicator 953 indicates whether or not the NAS server 1 that is identified by the NAS name 951 of a record entry in question has the snapshot sub-program 137. For example, when the NAS server 1 in question has the snapshot sub-program 137, a circle (a symbol meaning true (T) in Japanese) is stored as the snapshot sub-program indicator 953 whereas a cross (a symbol meaning false (F) in Japanese) is stored as the snapshot sub-program indicator 953 when the NAS server 1 in question does not have the snapshot sub-program 137.

The back-up sub-program indicator 954 indicates whether or not the NAS server 1 that is identified by the NAS name 951 of a record entry in question has the back-up sub-program 138. For example, when the NAS server 1 in question has the back-up sub-program 138, a circle (a symbol meaning true (T) in Japanese) is stored as the back-up sub-program indicator 954 whereas a cross (a symbol meaning false (F) in Japanese) is stored as the snapshot sub-program indicator 954 when the NAS server 1 in question does not have the back-up sub-program 138.

The file system capacity 955 indicates the capacity of the file system 134 in the NAS server 1 that is identified by the NAS name 951 of a record entry in question. The NAS-CPU utilization ratio 956 indicates the utilization ratio of the CPU 12 in the NAS server 1 that is identified by the NAS name 951 of a record entry in question.

The disk subsystem utilization ratio 957 indicates the utilization ratio of the disk subsystem 3 connected to the NAS server 1 that is identified by the NAS name 951 of a record entry in question. The utilization ratio of the disk subsystem 3 refers to the ratio of a length of time in which the disk subsystem 3 is in operation to a given length of time.

FIG. 11 is a configuration diagram of the migration destination NAS type determining rule 96 according to the embodiment of this invention.

The migration destination NAS type determining rule 96 contains a condition 961 and a migration destination NAS type name 962.

The condition 961 indicates a condition about a file group that is to be managed by the NAS server 1 classified into a NAS type that is identified by the migration destination NAS type name 962 of a record entry in question. Stored as the condition 961 is at least one of a condition about how many times a file group in question has been accessed, a condition about how may times a snapshot has been taken of a file group in question, a condition about how many times a snapshot of a file group in question has been mounted, a condition about how many times data in a file group in question has been backed up, and a condition about how many times data in a file group in question has been restored.

The migration destination NAS type name 962 indicates an identifier unique to a NAS type into which the NAS server 1 that is to manage a file group that meets the condition 961 of a record entry in question is classified.

FIG. 12 is a configuration diagram of the NAS type definition table 97 according to the embodiment of this invention.

The NAS type definition table 97 contains a NAS type name 971, an installed program 972, and a load state 973.

The NAS type name 971 indicates an identifier unique to each NAS type.

The installed program 972 indicates the type of a program in the NAS server 1 classified into a NAS type that is identified by the NAS type name 971 of a record entry in question.

For instance, when "CIFS" is stored as the installed program 972, it means that the NAS server 1 in question has the file sharing program 131 that is compatible with the CIFS protocol. When "NFS" is stored as the installed program 972, it means that the NAS server 1 in question has the file sharing program 131 that is compatible with the NFS protocol.

When "snapshot" is stored as the installed program 972, it means that the NAS server 1 in question has the snapshot sub-program 137. When "backup" is stored as the installed program 972, it means that the NAS server 1 in question has the back-up sub-program 138.

The load state 973 indicates a condition about the load on the NAS server 1 classified into a NAS type that is identified by the NAS type name 971 of a record entry in question. Stored as the load state 973 is, for example, one or both of a condition about the utilization ratio of the CPU 12 in the NAS server 1 in question and a condition about the utilization ratio of the disk subsystem 3 that is connected to the NAS server 1 in question.

FIG. 13 is a configuration diagram of the utilization state notification file 13311 according to the embodiment of this invention.

The utilization state notification file 13311 is sent from the NAS server 1 to the parent NAS server 6. The utilization state notification file 13311 contains information about the NAS server 1 that is the sender of this utilization state notification file 13311.

For example, the utilization state notification file 13311 contains a NAS name, a file system capacity, a utilization ratio, a program name, and a program utilization state.

The NAS name contained in the utilization state notification file 13311 indicates an identifier unique to the NAS server 1 that is the sender of this utilization state notification file 13311. The file system capacity indicates the capacity of the file system 134 of the identified NAS server 1.

The utilization ratio indicates the NAS-CPU utilization ratio or the disk subsystem utilization ratio, or both. The NAS-CPU utilization ratio is the utilization ratio of the CPU 12 of the identified NAS server 1. The disk subsystem utilization ratio is the utilization ratio of the disk subsystem 3 that is connected to the identified NAS server 1.

The program name indicates an identifier unique to a program that is stored in the identified NAS server 1.

The program utilization state indicates the utilization state of the program stored in the identified NAS server 1. The program utilization state in FIG. 13 contains the utilization state of the file sharing program 131, the utilization state of the snapshot sub-program 137, and the utilization state of the back-up sub-program 138.

Next, processing of the computer system according to the embodiment of this invention will be outlined.

Figure 14:
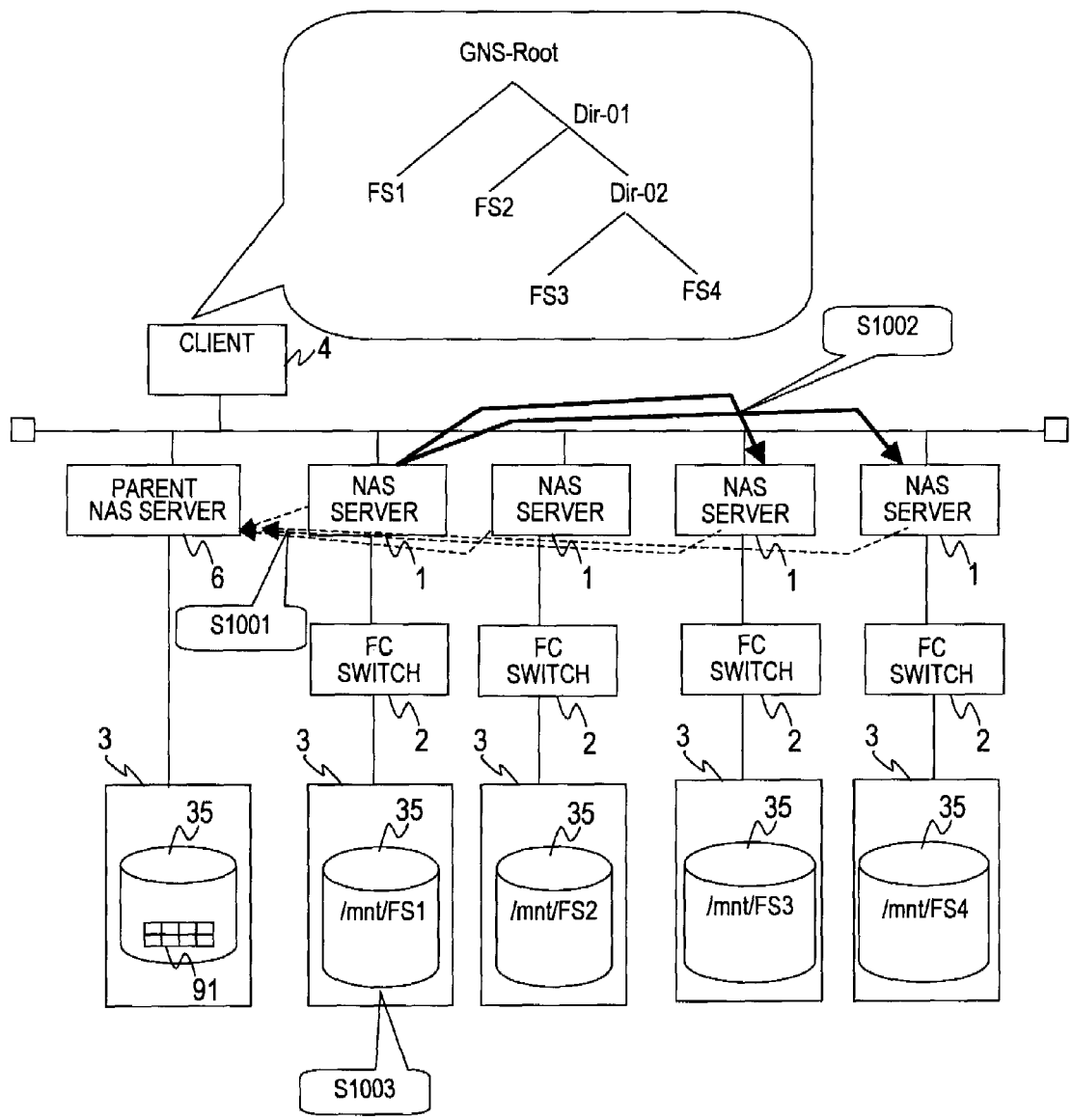
FIG. 14 is an explanatory diagram of a first overview of processing that is executed in the computer system according to the embodiment of this invention.

FIG. 14 is an explanatory diagram of a first overview of processing that is executed in the computer system according to the embodiment of this invention.

Each NAS server 1 obtains, at given intervals, the utilization state of at least one of its file sharing program 131, snapshot sub-program 137, and back-up sub-program 138. The NAS server 1 then creates the utilization state notification file 13311 that contains the obtained utilization state. The created utilization state notification file 13311 is sent from the NAS server 1 to the parent NAS server 6 (S1001).

The parent NAS server 6 receives the utilization state notification file 13311 from each NAS server 1. Based on the received utilization state notification file 13311, the parent NAS server 6 judges whether or not a program in the NAS server 1 is being used effectively by a file group.

When a program in the NAS server 1 is not being used effectively by a file group, the parent NAS server 6 identifies which NAS server 1 is suitable for management of the file group that is not using the program effectively, and specifies this NAS server 1 as the migration destination of the file group. The parent NAS server 6 sends a file group migration request to the NAS server 1 specified as the migration destination.

The file group to migrate is thus moved from the migration source NAS server 1 to the migration destination NAS server 1 (S1002).

After the migration of the file group is completed, the migration source NAS server 1 judges whether or not there is a file group managed by the migration source NAS server 1. When there is no file group managed by the migration source NAS server 1, the migration source NAS server 1 deletes data from the disk subsystem 3 that is connected to the migration source NAS server 1. NAS that has the migration source NAS server 1 is initialized in this manner (S1003).

The initialized NAS stands by until it is chosen as the migration destination of a file group.

Figure 15:
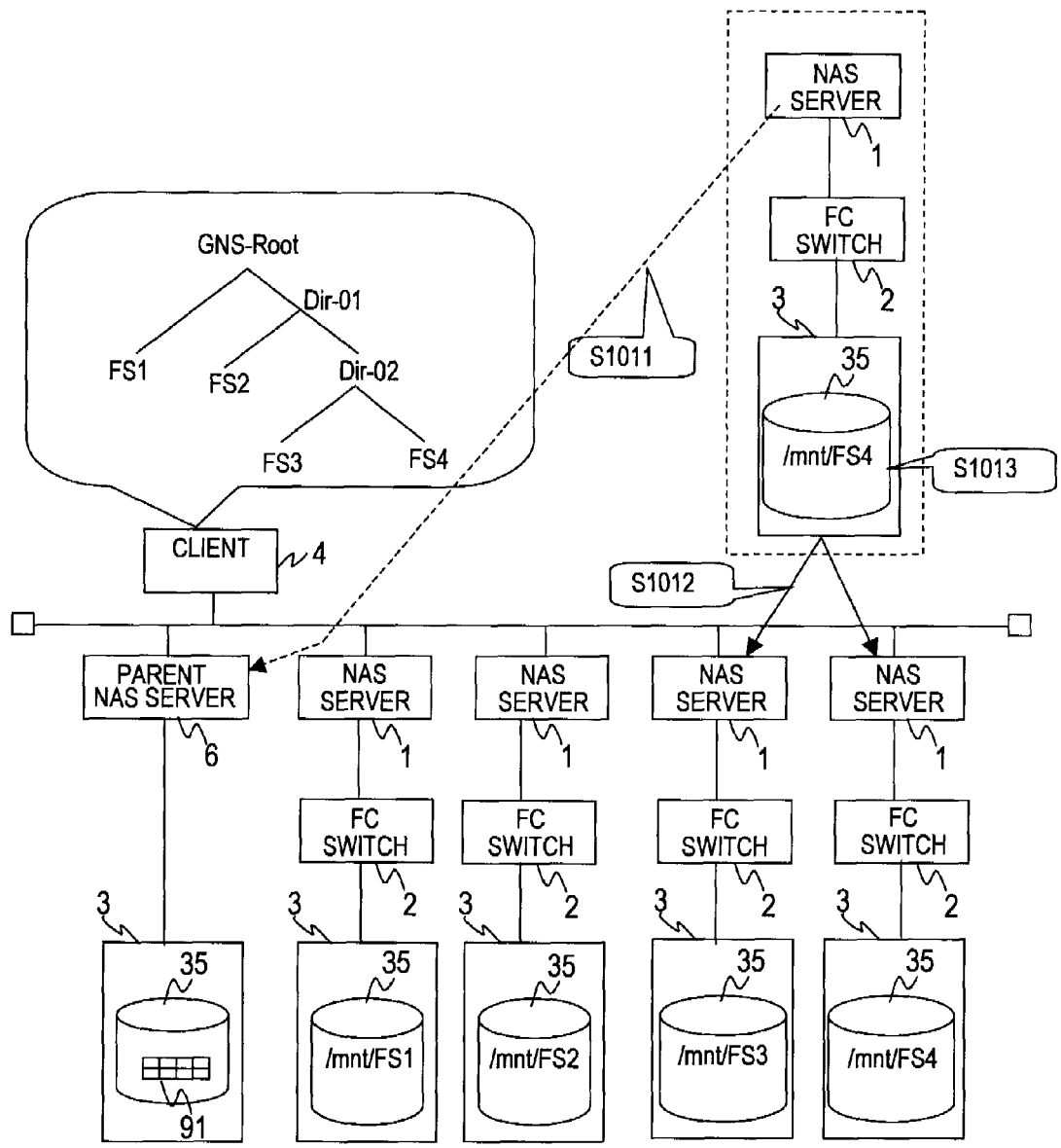
FIG. 15 is an explanatory diagram of a second overview of the processing that is executed in the computer system according to the embodiment of this invention.

FIG. 15 is an explanatory diagram of a second overview of the processing that is executed in the computer system according to the embodiment of this invention.

When a new NAS element is added to the GNS, the parent NAS server 6 causes the NAS server 1 of the newly added NAS (added NAS server 1) to install the NAS migration program 133.

The added NAS server 1 thus obtains, at given intervals, the utilization state of at least one of its file sharing program 131, snapshot sub-program 137, and back-up sub-program 138 which are provided with the added NAS server 1. The added NAS server 1 then creates the utilization state notification file 13311 that contains the obtained utilization state. The created utilization state notification file 13311 is sent from the added NAS server 1 to the parent NAS server 6 (S1011).

The parent NAS server 6 receives the utilization state notification file 13311 from the added NAS server 1. Based on the received utilization state notification file 13311, the parent NAS server 6 judges whether or not a program in the added NAS server 1 is being used effectively by a file group.

When a program in the added NAS server 1 is not being used effectively by a file group, the parent NAS server 6 identifies which NAS server 1 is suitable for management of the file group that is not using the program effectively, and specifies this NAS server 1 as the migration destination of the file group. The parent NAS server 6 sends a file group migration request to the NAS server 1 specified as the migration destination.

The file group to migrate is thus moved from the added NAS server 1 to the migration destination NAS server 1 (S1012).

After the migration of the file group is completed, the added NAS server 1 judges whether or not there is a file group managed by the added NAS server 1. When there is no file group managed by the added NAS server 1, the added NAS server 1 deletes data from the disk subsystem 3 that is connected to the added NAS server 1. The newly added NAS is initialized in this manner (S1013).

After being initialized, the newly added NAS stands by until it is chosen as the migration destination of a file group.

Figure 16:
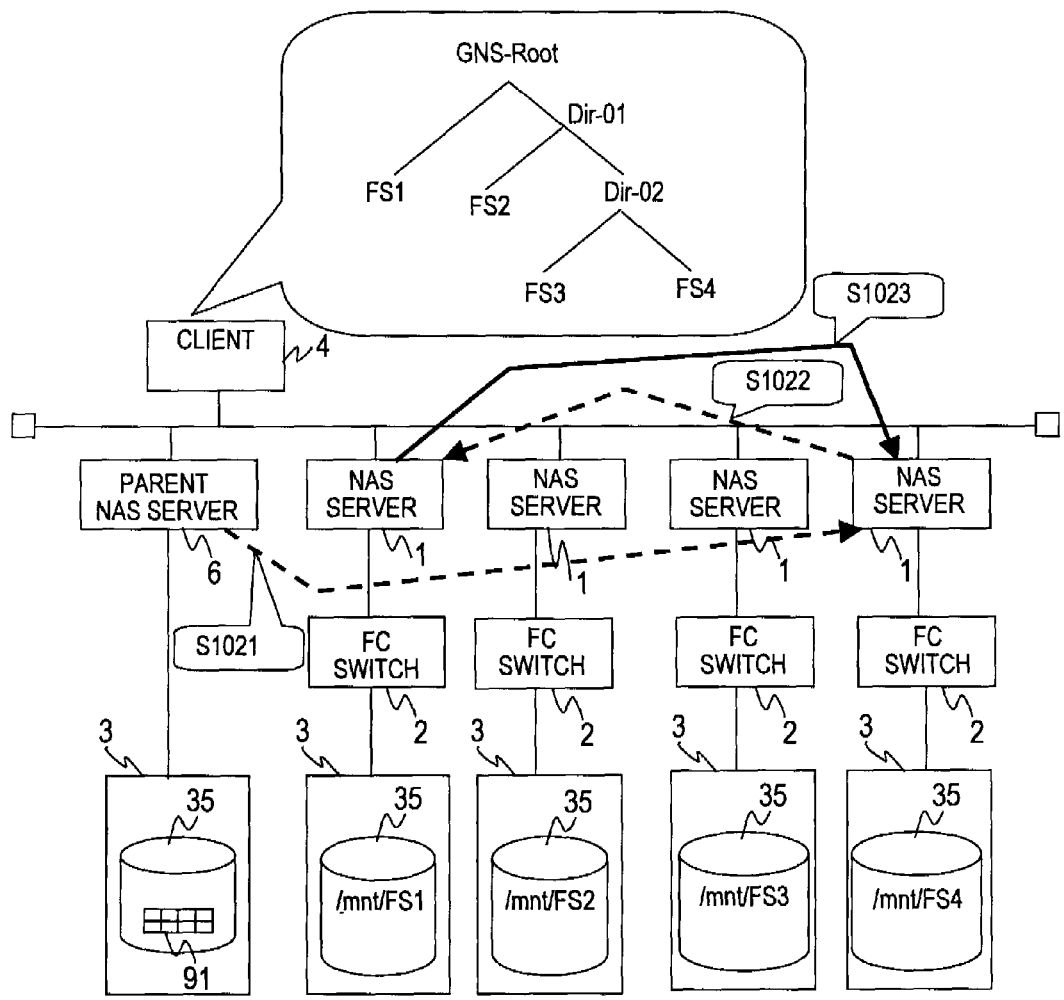
FIG. 16 is an explanatory diagram of a third overview of the processing that is executed in the computer system according to the embodiment of this invention.

FIG. 16 is an explanatory diagram of a third overview of the processing that is executed in the computer system according to the embodiment of this invention.

When judging that migration of a file group is necessary, the parent NAS server 6 sends a file group migration request to the NAS server 1 to which the file group is to migrate (S1021).

The migration destination NAS server 1 receives the file group migration request from the parent NAS server 6. The migration destination NAS server 1 then sends a file group migration request to the NAS server 1 from which the file group is to migrate (S1022).

The migration source NAS server 1 receives the file group migration request from the migration destination NAS server 1. The migration source NAS server 1 then sends, to the migration destination NAS server 1, information necessary for the migration of the file group to migrate.

The migration destination NAS server 1 receives the information necessary for the file group migration from the migration source NAS server 1. Based on the received information necessary for the file group migration, the migration destination NAS server 1 builds an environment for providing a file sharing service.

The migration destination NAS server 1 then obtains from the migration source NAS server 1 the file group that is to migrate (S1023). The migration destination NAS server 1 stores the obtained file group in the disk subsystem 3 that is connected to the migration destination NAS server 1, whereby completing the migration of the file group to migrate.

Figure 17:
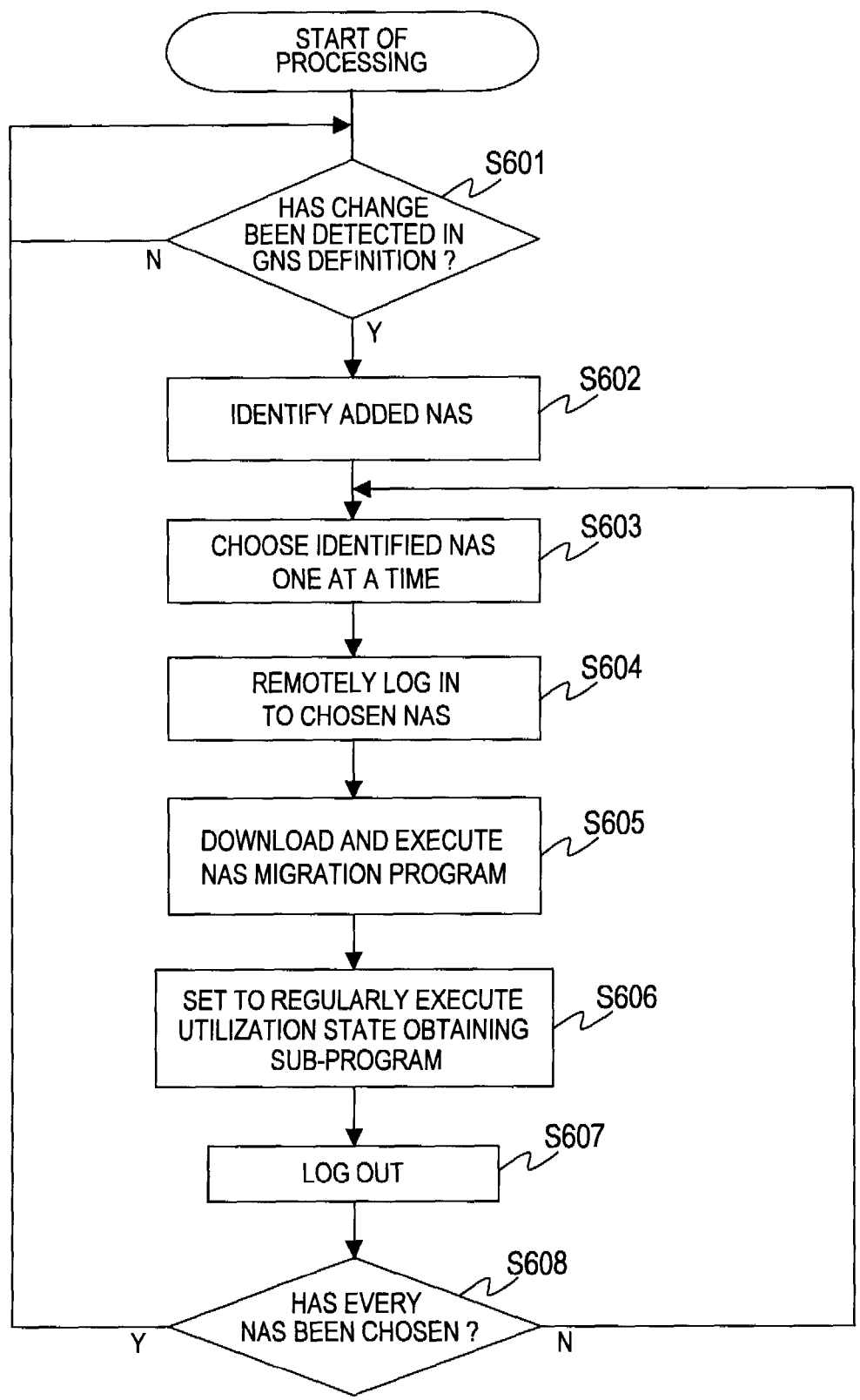
FIG. 17 is a flow chart for the NAS monitoring processing executed by the parent NAS server according to the embodiment of this invention.

FIG. 17 is a flow chart for the NAS monitoring processing executed by the parent NAS server 6 according to the embodiment of this invention.

The parent NAS server 6 regularly monitors the GNS definition table 91 to judge whether or not a new record entry has been added to the GNS definition table 91 (S601).

In the case where no new record has been added to the GNS definition table 91, the parent NAS server 6 stands by until a new record is added to the GNS definition table 91.

In the case where there is a new record added to the GNS definition table 91, it means that a new NAS element has been added to the GNS. Then the parent NAS server 6 identifies the NAS server 1 that is in the NAS newly added to the GNS (added NAS server 1) (S602).

Specifically, the parent NAS server 6 extracts the NAS name 912 from the new record added to the GNS definition table 91. The parent NAS server 6 identifies, as the added NAS server 1, the NAS server 1 that is identified by the extracted NAS name 912.

The parent NAS server 6 next chooses every NAS server 1 identified as the added NAS server 1 one at a time (S603). The parent NAS server 6 remotely logs in to the chosen added NAS server 1 (S604).

The added NAS server 1 to which the parent NAS server 6 is remotely logging in is controlled by the parent NAS server 6 to download the NAS migration program 133 from the parent NAS server 6. The parent NAS server 6 then makes the added NAS server 1 to which the parent NAS server 6 is remotely logging in execute the downloaded NAS migration program 133 (S605).

The parent NAS server 6 sets the added NAS server 1 to which the parent NAS server 6 is remotely logging in such that the utilization state obtaining sub-program 1331 contained in the NAS migration program 133 is run regularly (S606). As a result, the added NAS server 1 regularly executes the utilization state obtaining sub-program 1331.

The parent NAS server 6 then logs out from the added NAS server 1 to which it has remotely logged in (S607).

Next, the parent NAS server 6 judges whether or not every added NAS server 1 identified in Step S602 has been chosen in Step S603 (S608).

In the case where there is even one added NAS server 1 that has not been chosen, the parent NAS server 6 returns to Step S603. The parent NAS server 6 then chooses, out of all the identified added NAS servers 1, the added NAS server 1 that has not been chosen, and repeats the processing.

When every added NAS server 1 has been chosen, the parent NAS server 6 returns to Step S601, where the parent NAS server 6 repeats this NAS monitoring processing.

Figure 18:
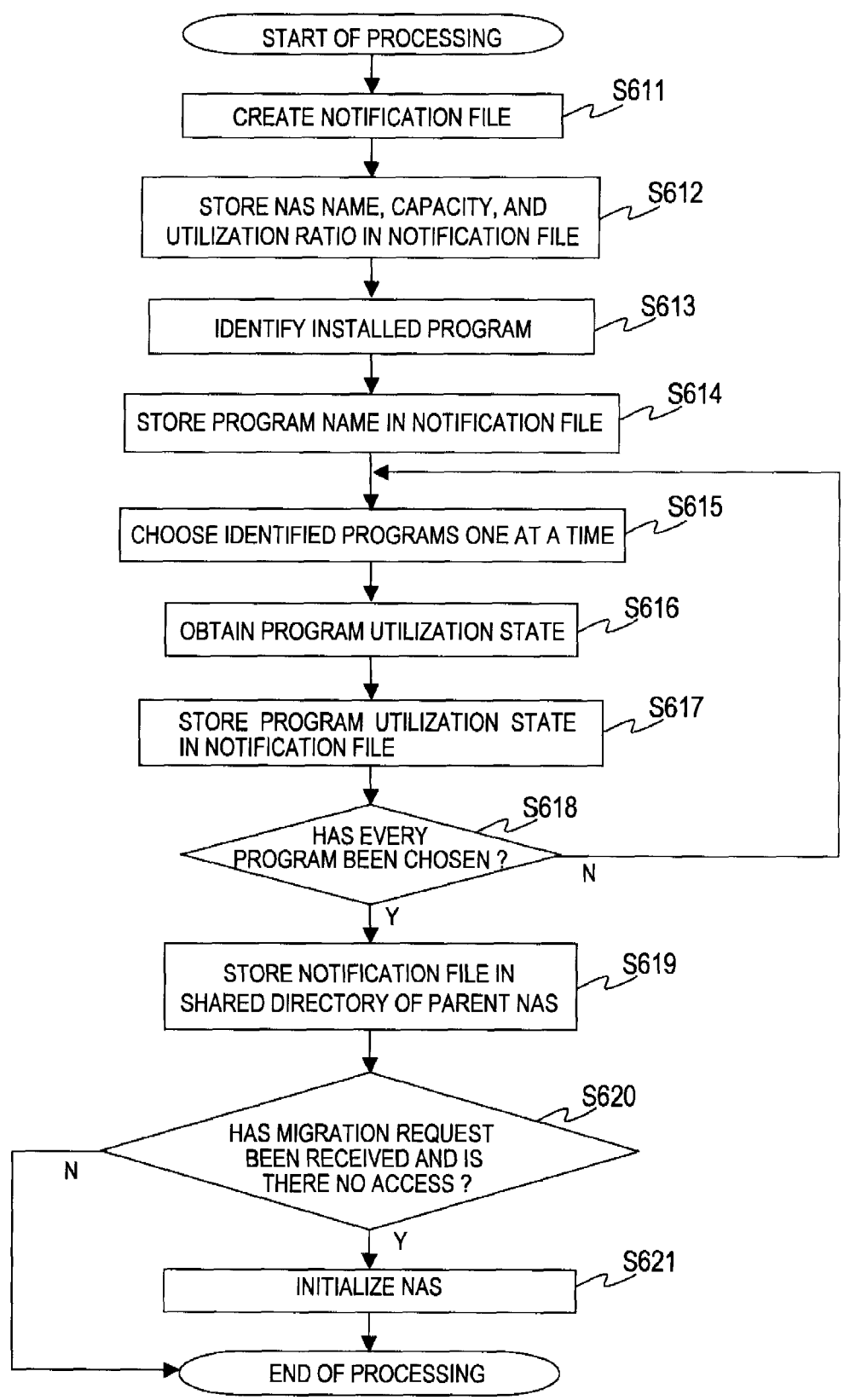
FIG. 18 is a flow chart for the utilization state obtaining processing executed by the NAS server according to the embodiment of this invention.

FIG. 18 is a flow chart for the utilization state obtaining processing executed by the NAS server 1 according to the embodiment of this invention.

The NAS server 1 regularly executes this utilization state obtaining processing.

First, the NAS server 1 creates the utilization state notification file 13311 shown in FIG. 13 (S611). The utilization state notification file 13311 at this point does not contain information.

Next, the NAS server 1 stores its own identifier as a NAS name in the created utilization state notification file 13311.

The NAS server 1 then obtains the capacity of the file system 134 that is located in this NAS server 1, the utilization ratio of the CPU 12 that is located in this NAS server 1, and the utilization ratio of the disk subsystem 3 that is connected to this NAS server 1. The NAS server 1 stores the obtained capacity of the file system 134, utilization ratio of the CPU 12, and utilization ratio of the disk subsystem 3 in the created utilization state notification file 13311 (S612).

Thereafter, the NAS server 1 identifies what program is stored in this NAS server 1 (S613). The NAS server 1 here identifies program stored in this NAS server 1 out of the file sharing program 131, the snapshot sub-program 137, and the back-up sub-program 138.

The NAS server 1 stores the identifier of the identified program in the created utilization state notification file 13311 (S614).

The NAS server 1 chooses every identified program one at a time (S615). For example, in the case where the file sharing program 131, the snapshot sub-program 137, and the back-up sub-program 138 are identified in Step S613, the NAS server 1 chooses the file sharing program 131, the snapshot sub-program 137, and the back-up sub-program 138 one by one in the stated order.

The NAS server 1 obtains the utilization state of the chosen program by each file group (S616). When the file sharing program 131 is chosen, the NFS access count and the CIFS access count are obtained as the utilization state of the program. When the snapshot sub-program 137 is chosen, the snapshot creation count and the snapshot mount count are obtained as the utilization state of the program. When the back-up sub-program 138 is chosen, the executed back-up count and the executed restoration count are obtained as the utilization state of the program.

The NAS server 1 stores the obtained program utilization state in the created utilization state notification file 13311. The NAS server 1 then judges whether or not every program identified in Step S613 has been chosen in Step S615 (S618).

In the case where not all the identified programs have been chosen, the NAS server 1 returns to Step S615. The NAS server 1 then chooses, out of all the identified programs, one that has not been chosen and repeats the processing.

When every identified program has been chosen, the NAS server 1 stores the created utilization state notification file 13311 in a shared directory of the parent NAS server 6 (S619). The shared directory is used for the handing over of the utilization state notification file 13311 to the parent NAS server 6 from the NAS server 1.

Next, the NAS server 1 judges whether or not a file group migration request has been received. The NAS server 1 judges whether or not a file group migration request has been received by, for example, referring to a log.

When no file group migration request has been received, it means that there is a file that is managed by this NAS server 1. The NAS server 1 therefore ends this utilization state obtaining processing.

When there is a file group migration request received, the NAS server 1 judges whether or not access to a file managed by this NAS server 1 has been registered within a given period between the current time and an earlier point in time (S620).

In the case where the file access has been made, it means that there is a file that is managed by this NAS server 1. The NAS server 1 therefore ends this utilization state obtaining processing.

In the case where the file access has not been made, it means that there is no file managed by this NAS server 1. Then the NAS server 1 deletes data from the disk subsystem 3 that is connected to the NAS server 1. The NAS that has this NAS server 1 is initialized in this manner (S621). The NAS server 1 then ends this utilization state obtaining processing.

Figure 19:
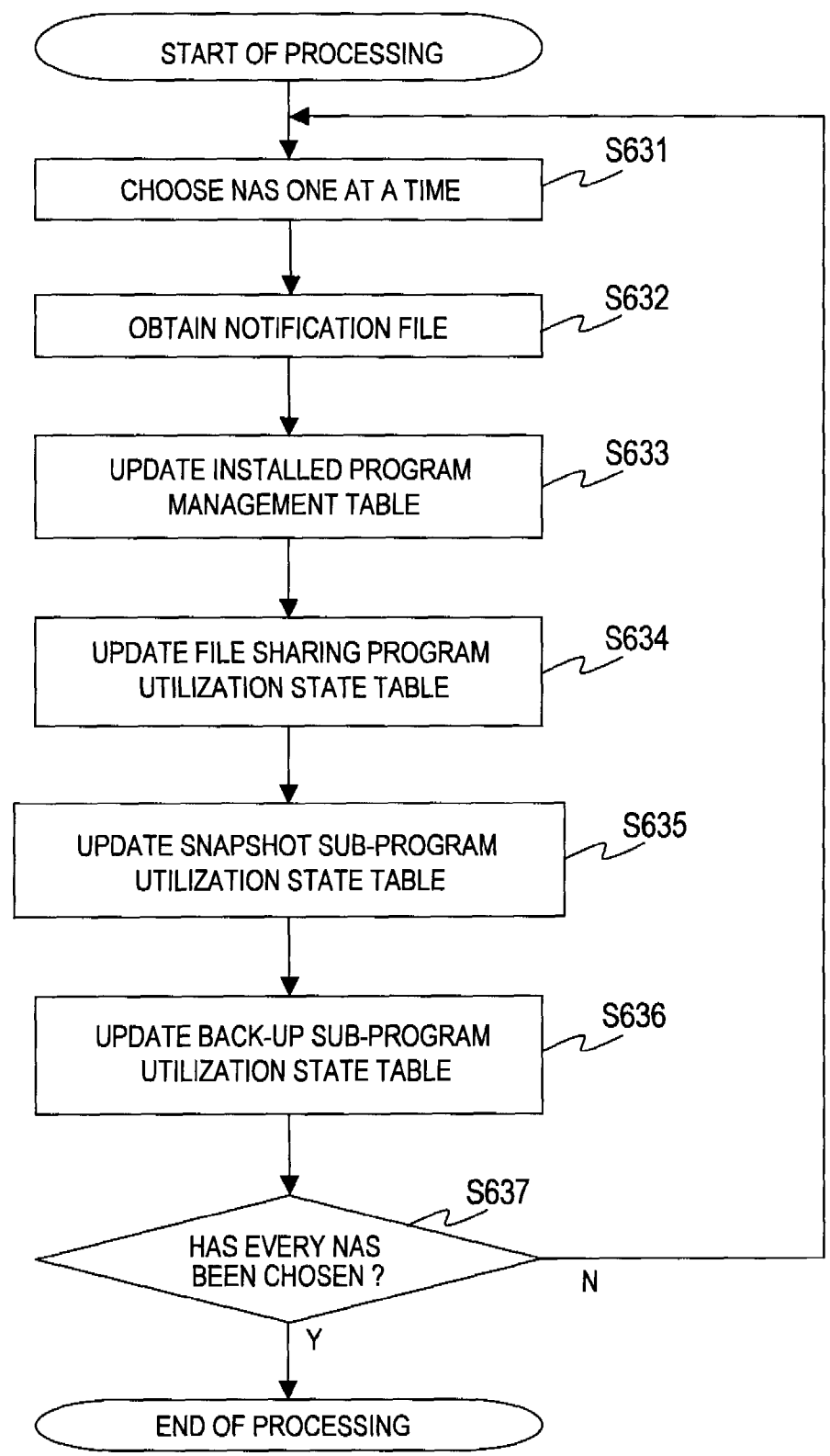
FIG. 19 is a flow chart for the utilization state totalizing processing executed by the parent NAS server according to the embodiment of this invention.

FIG. 19 is a flow chart for the utilization state totalizing processing executed by the parent NAS server 6 according to the embodiment of this invention.

The parent NAS server 6 regularly executes this utilization state totalizing processing.

First, the parent NAS server 6 chooses every NAS server 1 constituting the GNS one at a time (S631).

Next, the parent NAS server 6 obtains, from its shared directory, the utilization state notification file 13311 that has been stored in the shared directory by the chosen NAS server 1. Specifically, the parent NAS server 6 retrieves from its shared directory the utilization state notification file 13311 that contains as a NAS name the identifier of the chosen NAS server 1 (S632).

The parent NAS server 6 updates the installed program management table 95 according to the retrieved utilization state notification file 13311 (S633).

Specifically, the parent NAS server 6 chooses from the installed program management table 95 a record entry whose NAS name 951 matches the NAS name contained in the obtained utilization state notification file 13311.

The parent NAS server 6 then judges whether or not the identifier of the file sharing program 131 is contained in the obtained utilization state notification file 13311.

When the obtained utilization state notification file 13311 contains the identifier of the file sharing program 131, the parent NAS server 6 stores a circle (a symbol meaning true (T) in Japanese) as the file sharing program indicator 952 of the chosen record.

When the obtained utilization state notification file 13311 does not contain the identifier of the file sharing program 131, the parent NAS server 6 stores a cross (a symbol meaning false (F) in Japanese) as the file sharing program indicator 952 of the chosen record.

The parent NAS server 6 then judges whether or not the identifier of the snapshot sub-program 137 is contained in the obtained utilization state notification file 13311.

When the obtained utilization state notification file 13311 contains the identifier of the snapshot sub-program 137, the parent NAS server 6 stores a circle (a symbol meaning true (T) in Japanese) as the snapshot sub-program indicator 953 of the chosen record.

When the obtained utilization state notification file 13311 does not contain the identifier of the snapshot sub-program 137, the parent NAS server 6 stores a cross (a symbol meaning false (F) in Japanese) as the snapshot sub-program indicator 953 of the chosen record.

The parent NAS server 6 then judges whether or not the identifier of the back-up sub-program 138 is contained in the obtained utilization state notification file 13311.

When the obtained utilization state notification file 13311 contains the identifier of the back-up sub-program 138, the parent NAS server 6 stores a circle (a symbol meaning true (T) in Japanese) as the back-up sub-program indicator 954 of the chosen record.

When the obtained utilization state notification file 13311 does not contain the identifier of the back-up sub-program 138, the parent NAS server 6 stores a cross (a symbol meaning false (F) in Japanese) as the back-up sub-program indicator 954 of the chosen record.

The parent NAS server 6 then stores, as the file system capacity 955 of the chosen record, the capacity of the file system 134 that is contained in the obtained utilization state notification file 13311. As the NAS-CPU utilization ratio 956 of the chosen record, the parent NAS server 6 stores the utilization ratio of the CPU 12 that is contained in the obtained utilization state notification file 13311. As the disk subsystem utilization ratio 957 of the chosen record, the parent NAS server 6 stores the utilization ratio of the disk subsystem 3 that is contained in the obtained utilization state notification file 13311.

The parent NAS server 6 updates the installed program management table 95 in this manner.

Next, the parent NAS server 6 judges whether or not the obtained utilization state notification file 13311 contains the utilization state of the file sharing program 131. When the utilization state notification file 13311 does not contain the utilization state of the file sharing program 131, the parent NAS server 6 proceeds directly to Step S635.

When the utilization state notification file 13311 contains the utilization state of the file sharing program 131, the parent NAS server 6 updates the file sharing program utilization state table 92 (S634).

Specifically, the parent NAS server 6 selects record entries of the file sharing program utilization state table 92 that have, as the NAS name 921, the NAS name contained in the obtained utilization state notification file 13311. From among the selected records of the file sharing program utilization state table 92, the parent NAS server 6 chooses one whose file group name 922 matches the file group name that is contained in the obtained utilization state notification file 13311.

The parent NAS server 6 then stores, as the NFS access count 923 of the chosen record, the NFS access count that is contained in the obtained utilization state notification file 13311. As the CIFS access count 924 of the chosen record, the parent NAS server 6 stores the CIFS access count that is contained in the obtained utilization state notification file 13311.

The parent NAS server 6 updates the file sharing program utilization state table 92 in this manner.

Next, the parent NAS server 6 judges whether or not the obtained utilization state notification file 13311 contains the utilization state of the snapshot sub-program 137. When the utilization state notification file 13311 does not contain the utilization state of the snapshot sub-program 137, the parent NAS server 6 proceeds directly to Step S636.

When the utilization state notification file 13311 contains the utilization state of the snapshot sub-program 137, the parent NAS server 6 updates the snapshot sub-program utilization state table 93 (S635).

Specifically, the parent NAS server 6 selects record entries of the snapshot sub-program utilization state table 93 that have, as the NAS name 931, the NAS name contained in the obtained utilization state notification file 13311. From among the selected records of the snapshot sub-program utilization state table 93, the parent NAS server 6 chooses one whose file group name 932 matches the file group name that is contained in the obtained utilization state notification file 13311.

The parent NAS server 6 then stores, as the snapshot creating count 933 of the chosen record, the snapshot creation count that is contained in the obtained utilization state notification file 13311. As the snapshot mount count 934 of the chosen record, the parent NAS server 6 stores the snapshot mount count that is contained in the obtained utilization state notification file 13311.

The parent NAS server 6 updates the snapshot sub-program utilization state table 93 in this manner.

Next, the parent NAS server 6 judges whether or not the obtained utilization state notification file 13311 contains the utilization state of the back-up sub-program 138. When the utilization state notification file 13311 does not contain the utilization state of the back-up sub-program 138, the parent NAS server 6 proceeds directly to Step S637.

When the utilization state notification file 13311 contains the utilization state of the back-up sub-program 138, the parent NAS server 6 updates the back-up sub-program utilization state table 94 (S636).

Specifically, the parent NAS server 6 selects record entries of the back-up sub-program utilization state table 94 that have, as the NAS name 941, the NAS name contained in the obtained utilization state notification file 13311. From among the selected records of the back-up sub-program utilization state table 94, the parent NAS server 6 chooses one whose file group name 942 matches the file group name that is contained in the obtained utilization state notification file 13311.

The parent NAS server 6 then stores, as the executed back-up count 943 of the chosen record, the executed back-up count that is contained in the obtained utilization state notification file 13311. As the executed restoration count 944 of the chosen record, the parent NAS server 6 stores the executed restoration count that is contained in the obtained utilization state notification file 13311.

The parent NAS server 6 updates the back-up sub-program utilization state table 94 in this manner.

Next, the parent NAS server 6 judges whether or not every NAS server 1 constituting the GNS has been chosen in Step S631 (S637).

In the case where not all of the NAS servers 1 have been chosen, the parent NAS server 6 returns to Step S631. The parent NAS server 6 then chooses, out of all the NAS servers 1 constituting the GNS, one that has not been chosen and repeats the processing.

When every NAS server 1 constituting the GNS has been chosen, the parent NAS server 6 ends this utilization state totalizing processing.

Figure 20:
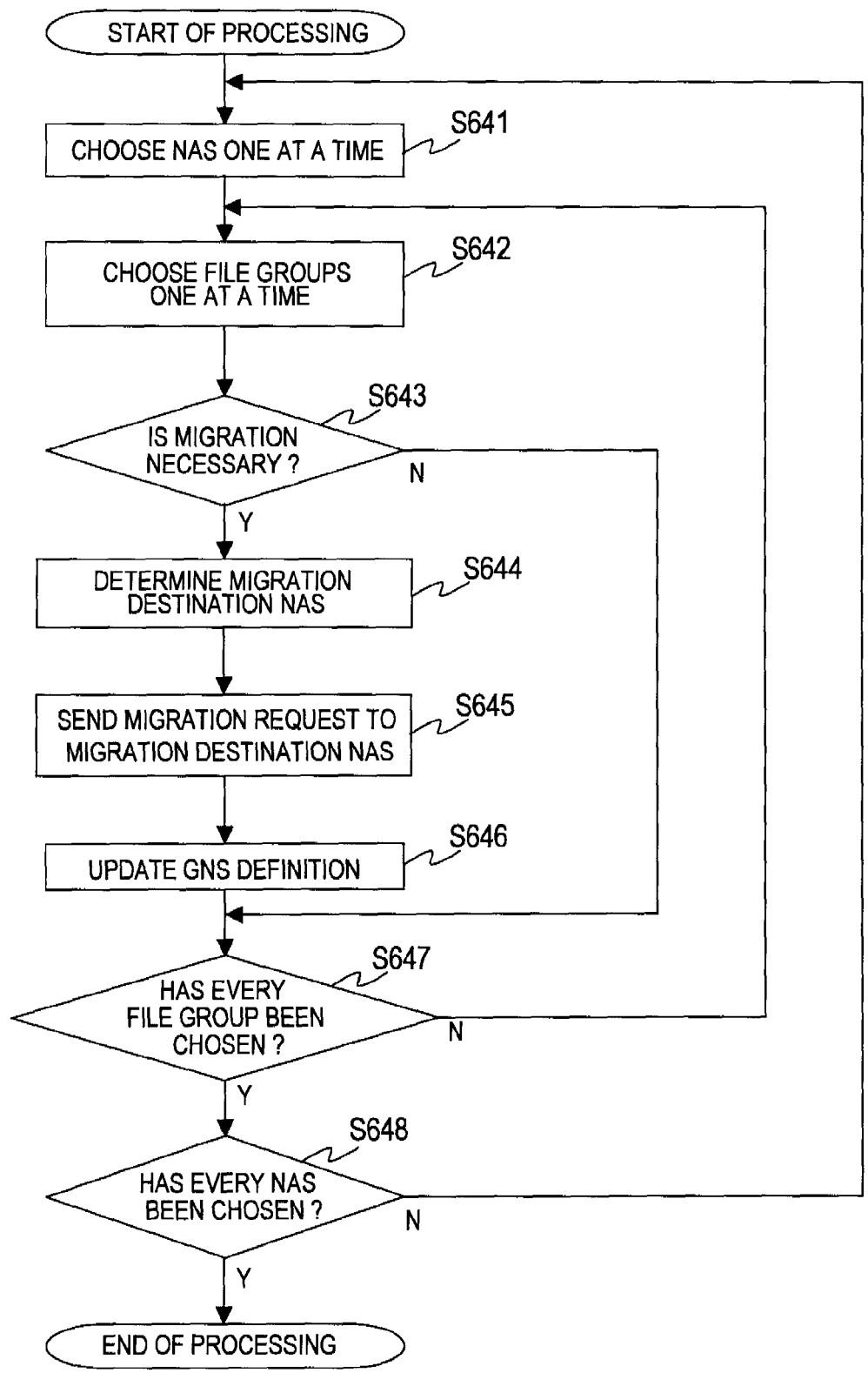
FIG. 20 is a flow chart for the migration judging processing executed by the parent NAS server according to the embodiment of this invention.

FIG. 20 is a flow chart for the migration judging processing executed by the parent NAS server 6 according to the embodiment of this invention.

The parent NAS server 6 regularly executes this migration judging processing.

First, the parent NAS server 6 chooses every NAS server 1 constituting the GNS one at a time (S641).

Next, the parent NAS server 6 chooses, one by one, every file group that is managed by the chosen NAS server 1 (S642).

The parent NAS server 6 then selects record entries of the file sharing program utilization state table 92 that have, as the NAS name 921, the identifier of the chosen NAS server 1. From among the selected records of the file sharing program utilization state table 92, the parent NAS server 6 chooses one whose file group name 922 matches the identifier of the chosen file group. The parent NAS server 6 extracts the NFS access count 923 and the CIFS access count 924 from the chosen record.

The parent NAS server 6 then selects record entries of the snapshot sub-program utilization state table 93 that have, as the NAS name 931, the identifier of the chosen NAS server 1. From among the selected records of the snapshot sub-program utilization state table 93, the parent NAS server 6 chooses one whose file group name 932 matches the identifier of the chosen file group. The parent NAS server 6 extracts the snapshot creation count 933 and the snapshot mount count 934 from the chosen record.

The parent NAS server 6 then selects record entries of the back-up sub-program utilization state table 94 that have, as the NAS name 941, the identifier of the chosen NAS server 1. From among the selected records of the back-up sub-program utilization state table 94, the parent NAS server 6 chooses one whose file group name 942 matches the identifier of the chosen file group. The parent NAS server 6 extracts the executed back-up count 943 and the executed restoration count 944 from the chosen record.

The parent NAS server 6 next chooses a record entry of the migration destination NAS type determining rule 96 whose condition 961 matches the extracted NFS access count 923, CIFS access count 924, snapshot creation count 933, snapshot mount count 934, executed back-up count 943, and executed restoration count 944. From the chosen record, the parent NAS server 6 extracts the migration destination NAS type name 962.

The parent NAS server 6 judges whether or not the extracted migration destination NAS type name 962 matches the identifier of a NAS type into which the chosen NAS server 1 is classified. The parent NAS server 6 thus judges whether or not migration of the chosen file group is necessary (S643).

When the identifier of the NAS type and the migration destination NAS type name 962 are a match, the parent NAS server 6 judges that the chosen file group does not need to migrate. Then the parent NAS server 6 proceeds directly to Step S647.

When the identifier of the NAS type and the migration destination NAS type name 962 are not a match, the parent NAS server 6 judges that the chosen file group needs to migrate. Then the parent NAS server 6 chooses a record entry of the NAS type definition table 97 whose NAS type name 971 matches the extracted migration destination NAS type name 962. From the chosen record of the NAS type definition table 97, the parent NAS server 6 extracts the installed program 972 and the load state 973.

The parent NAS server 6 selects every record entry of the installed program management table 95 whose file sharing program indicator 952, snapshot sub-program indicator 953, and back-up sub-program indicator 954 match the extracted installed program 972. From among the selected records of the installed program management table 95, the parent NAS server 6 chooses one whose NAS-CPU utilization ratio 956 and disk subsystem utilization ratio 957 match the extracted load state 973. The parent NAS server 6 then extracts the NAS name 951 from the chosen record.

The parent NAS server 6 determines the NAS server 1 that is identified by the extracted NAS name 951 as the migration destination of the chosen file group (S644).

The parent NAS server 6 sends a file group migration request to the NAS server 1 determined as the migration destination (S645). The file group migration request contains, as the identifier of the migration source NAS server 1, the identifier of the NAS server 1 chosen in Step S641. The file group migration request also contains, as the identifier of the file group to migrate, the identifier of the file group chosen in Step S642.

Next, the parent NAS server 6 updates the GNS definition table 91 (S646).

Specifically, the parent NAS server 6 chooses a record entry of the GNS definition table 91 that has, as the global path 911, a global path used to access the file group to migrate. The parent NAS server 6 stores the identifier of the determined migration destination NAS server 1 as the NAS name 912 of the chosen record. As the local path 913 of the chosen record, the parent NAS server 6 stores a local path of the file system 134 in the determined migration destination NAS server 1.

The parent NAS server 6 then judges whether or not every file group managed by the chosen NAS server 1 has been chosen in Step S642 (S647).

In the case where not all of the file groups have been chosen, the parent NAS server 6 returns to Step S642. The parent NAS server 6 then chooses, out of all the file groups managed by the chosen NAS server 1, one that has not been chosen and repeats the processing.

When every file group managed by the chosen NAS server 1 has been chosen, the parent NAS server 6 judges whether or not every NAS server 1 constituting the GNS has been chosen in Step S641 (S648).

In the case where not all of the NAS servers 1 have been chosen, the parent NAS server 6 returns to Step S641. The parent NAS server 6 then chooses, out of all the NAS servers 1 constituting the GNS, one that has not been chosen and repeats the processing.

When every NAS server 1 constituting the GNS has been chosen, the parent NAS server 6 ends this utilization state totalizing processing.

Figure 21:
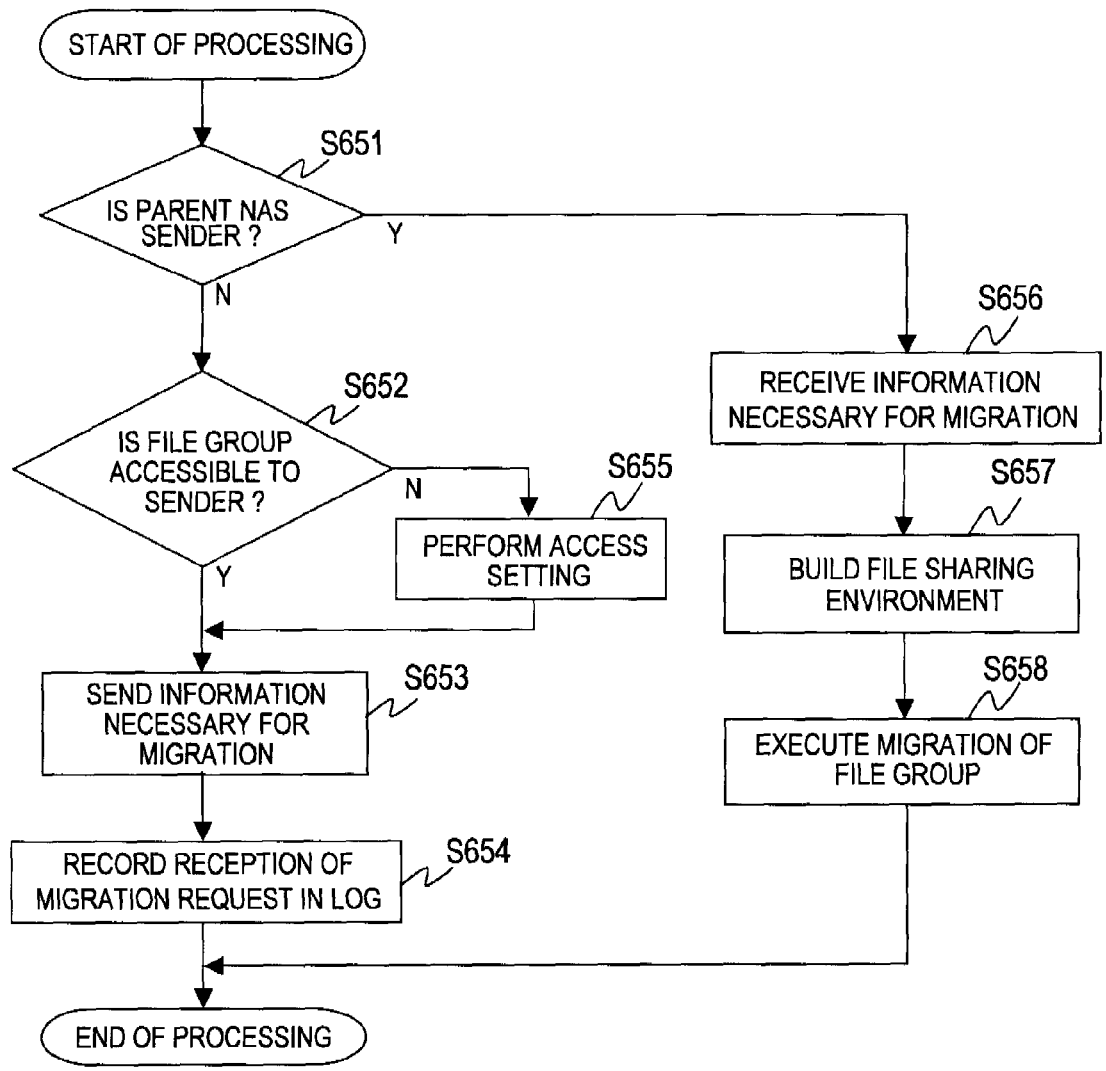
FIG. 21 is a flow chart for the migration processing executed by the NAS server according to the embodiment of this invention.

FIG. 21 is a flow chart for the migration processing executed by the NAS server 1 according to the embodiment of this invention.

The NAS server 1 executes this migration processing upon receiving a file group migration request from the parent NAS server 6 or from other NAS servers 1.

First, the NAS server 1 judges whether or not the sender of the received file group migration request is the parent NAS server 6 (S651). Specifically, the NAS server 1 judges whether the sender of the received file group migration request is the parent NAS server 6 or not based on a source IP address that is contained in the received file group migration request (S652).

When the parent NAS server 6 is not the sender of the file group migration request, it means that the file group migrates from this NAS server 1. The migration source NAS server 1 therefore judges whether or not the file group to migrate is accessible to the migration destination NAS server 1 which is the sender of the file group migration request.

In the case where the file group to migrate is accessible to the migration destination NAS server 1, the migration source NAS server 1 proceeds directly to Step S653.

In the case where the file group to migrate is not accessible to the migration destination NAS server 1, the migration source NAS server 1 sets access settings to make the file group to migrate accessible to the migration destination NAS server 1 (S655).

The migration source NAS server 1 next sends, to the migration destination NAS server 1, information necessary for migration of the file group (S653). The information necessary for file group migration includes, for example, the capacity of the file system 134 that manages the file group to migrate.

Thereafter, the migration source NAS server 1 records the reception of the file group migration request in a log (S654). The migration source NAS server 1 then ends this migration processing.

On the other hand, when the parent NAS server 6 is the sender of the file group migration request, it means that this NAS server 1 is the migration destination of the file group. The migration destination NAS server 1 accordingly receives, from the migration source NAS server 1, information necessary for migration of the file group (S656).

Based on the received information necessary for the file group migration, the migration destination NAS server 1 builds an environment for providing a file sharing service (S657).

Next, the migration destination NAS server 1 obtains, from the migration source NAS server 1, the file group to migrate. The migration destination NAS server 1 stores the obtained file group in the disk subsystem 3 that is connected to the migration destination NAS server 1. This completes the migration of the file group to migrate (S658).

A snapshot of a file group to migrate may migrate to the migration destination NAS server 1 in addition to the file group to migrate.

For instance, the migration destination NAS server 1 requests the migration source NAS server 1 to mount a snapshot of the file group to migrate. The migration source NAS server 1 mounts the snapshot requested to be mounted.

The migration destination NAS server 1 obtains the mounted snapshot from the migration source NAS server 1. The migration destination NAS server 1 stores the obtained snapshot in the disk subsystem 3 that is connected to the migration destination NAS server 1.

In the case where the disk subsystem 3 that is connected to the migration source NAS server 1 and the disk subsystem 3 that is connected to the migration destination NAS server 1 are interconnected, a logical volume storing differential data between a file group to migrate and a snapshot may migrate from one of the two disk subsystems 3 to the other.

The migration destination NAS server 1 then ends this migration processing.

The parent NAS server 6 may sends a file group migration completion notification to the management computer 5 upon completion of file group migration. Receiving the file group migration completion notification, the management computer 5 displays a file group migration completion notification screen shown in FIG. 22.

FIG. 22 is an explanatory diagram of the file group migration completion notification screen displayed by the management computer 5 according to the embodiment of this invention.

The file group migration completion notification screen indicates that migration of a file group has been completed. The file group migration completion notification screen contains the identifier of a file group that has migrated, the identifier of the migration source NAS server 1, the identifier of the migration destination NAS server 1, the reason why the migration has been necessary, and the like.

In this embodiment, migration of a file group is executed automatically when it is judged that the file group needs to migrate. Alternatively, the parent NAS server 6 may sends a file group migration recommendation notification to the management computer 5 when judging in Step S643 of the migration judging processing, which is shown in FIG. 20, that file group migration is necessary. Receiving the file group migration recommendation notification, the management computer 5 displays a file group migration recommendation screen.

FIG. 23 is an explanatory diagram of the file group migration recommendation screen displayed by the management computer 5 according to the embodiment of this invention.

The file group migration recommendation screen indicates that migration of a file group is advised. The file group migration recommendation screen contains an identifier assigned to a file group of which migration is recommended, the identifier of the migration source NAS server 1, the reason why migration of the file group is recommended, and the like.

The file group migration recommendation screen also contains a migration destination NAS input field, a "migrate" button, and a "cancel" button. In the migration destination NAS input field, the identifier of the NAS server 1 to which the file group is to migrate is entered. An administrator operates the "migrate" button to request migration to the NAS server 1 that is identified by the identifier entered in the migration destination NAS input field. The administrator operates the "cancel" button to request not to execute the file group migration.

When the "migrate" button on the file group migration recommendation screen is operated, the management computer 5 notifies the parent NAS server 6 of the identifier entered in the migration destination NAS input field. The parent NAS server 6 determines the NAS server 1 that is identified by the notified identifier as the migration destination.

According to this embodiment, migration of a file group is executed according to the utilization state of at least one of the file sharing program 131, the snapshot sub-program 137, and the back-up sub-program 138 which are stored in the NAS server 1. The file sharing program 131, the snapshot sub-program 137, and the back-up sub-program 138 in the NAS server 1 are thus used efficiently.

While the present invention has been described in detail and pictorially in the accompanying drawings, the present invention is not limited to such detail but covers various obvious modifications and equivalent arrangements, which fall within the purview of the appended claims.

What is claimed is:

1. A file management method for a computer system having: one first server accessed by a client computer; a plurality of second servers coupled to the first server via a network; and a plurality of storage subsystems coupled to the second servers, the file management method comprising:

providing, by the second server, as at least one file, data stored in the storage subsystem;

executing, by the second server, at least one first program which performs processing related to a file group, the file group including the at least one file;

integrating, by the first server, directory structures that are unique to the respective second servers to provide a directory structure that is unique throughout the computer system to the client computer;

obtaining, by the first server, from the second server, a utilization state of the first program executed by the second server;

judging, by the first server, from the obtained first program utilization state, whether or not migration of the file group is necessary; and instructing, by the first server, the second server to migrate the file group in a case where it is judged that the file group needs to migrate, said method further comprising:

storing, by the first server, GNS definition information for indicating an association between a directory path that is unique throughout the computer system and a directory path that is unique to the respective second servers;

receiving, by the first server, an access request which includes, as an access destination, a directory path that is unique throughout the computer system;

converting, by the first server, directory path included in the received access request into a directory path that is unique to the respective second server based on the GNS definition information; and sending, by the first server, the access request including the converted directory path to the second server.

2. The file management method according to claim 1, wherein the first programs include at least one of a file sharing program for providing a file sharing service to the client computer, a snapshot program for taking a snapshot of the file group, and a back-up program for backing up the file group.

3. The file management method according to claim 1, wherein the first program utilization state includes at least one of a count of access made to the file group, a count of snapshots taken of the file group, a snapshot mount count of the file group, a count of backups taken of the file group, and a restoration count of the file group.

4. The file management method according to claim 1, further comprising determining, by the first server, which of the second servers is to serve as a migration destination of the file group with reference to the obtained first program utilization state, wherein the step of instructing the file group migration includes instructing, by the first server, the second server determined as the migration destination to migrate the file group.

5. The file management method according to claim 1, further comprising migrating, by the second server, upon receiving the file group migration instruction, the file group, a snapshot of the file group, and an environment for managing the file group.

6. The file management method according to claim 1, further comprising:

remotely logging in, by the first server, in a case where a new second server is added to the computer system, to the added second server; and causing, by the first server, the added second server to download a second program from the first server, the second program performing processing that is related to migration of the file group.

7. The file management method according to claim 1, further comprising updating, by the first server, the GNS definition information after instructing the file group migration.

8. A computer system, comprising:

one first server accessed by a client computer;

a plurality of second servers coupled to the first server via a network; and a plurality of storage subsystems coupled to the second servers, the second server being configured to:

provide, as at least one file, data stored in the storage subsystem; and execute at least one first program which performs processing related to a file group, the file group including the at least one file;

the first server being configured to:

integrate directory structures that is unique to the respective second servers to provide a directory structure that is unique throughout the computer system to the client computer;

obtain a utilization state of the first program executed by the second server;

judge whether or not migration of the file group is necessary; and instruct the second servers to migrate the file group in a case where it is judged that the file group needs to migrate, wherein the first server is further configured to:

store GNS definition information for indicating an association between a directory path that is unique throughout the computer system and a directory path that is unique to the respective second servers;

receive an access request which includes, as an access destination, a directory path that is unique throughout the computer system;

convert the directory path included in the received access request into a directory path that is unique to the respective second servers based on the GNS definition information; and send the access request including the converted directory path to the second server.

9. The computer system according to claim 8, wherein the first programs include at least one of a file sharing program for providing a file sharing service to the client computer, a snapshot program for taking a snapshot of the file group, and a back-up program for backing up the file group.

10. The computer system according to claim 8, wherein the first program utilization state includes at least one of a count of access made to the file group, a count of snapshots taken of the file group, a snapshot mount count of the file group, a count of backups taken of the file group, and a restoration count of the file group.

11. The computer system according to claim 8, wherein the first server is further configured to:

refer to the obtained first program utilization state to determine which of the second servers is to serve as a migration destination of the file group; and instruct the second server determined as the migration destination to migrate the file group.

12. The computer system according to claim 8, wherein, upon receiving the file group migration instruction, the second server migrates the file group, a snapshot of the file group, and an environment for managing the file group.

13. The computer system according to claim 8, wherein the first server is further configured to:
   remotely log in to the added second server in a case where a new second server is added to the computer system; and
   cause the added second server to download a second program from the first server, the second program performing processing that is related to migration of the file group.

14. The computer system according to claim 8, wherein the first server updates the GNS definition information after instructing the file group migration.

* * * * *